United States Patent
Kim et al.

(10) Patent No.: US 7,540,618 B2
(45) Date of Patent: Jun. 2, 2009

(54) THIN PROJECTOR

(75) Inventors: Nam Sik Kim, Gyeonggi-do (KR); Seung Gyu Lee, Yongin-si (KR); Soon Hyung Kwon, Seoul (KR); Jun Ho Lee, Gyeonggi-do (KR); Ki So Bok, Seoul (KR); Han Kyoung Cho, Daegu (KR)

(73) Assignee: LG Electronics Inc., Seoul (KR)

( * ) Notice: Subject to any disclaimer, the term of this patent is extended or adjusted under 35 U.S.C. 154(b) by 415 days.

(21) Appl. No.: 11/305,103

(22) Filed: Dec. 19, 2005

(65) Prior Publication Data

US 2006/0132728 A1 Jun. 22, 2006

(30) Foreign Application Priority Data

| Dec. 21, 2004 | (KR) | ...................... 10-2004-0109323 |
| Dec. 22, 2004 | (KR) | ...................... 10-2004-0110193 |
| May 27, 2005 | (KR) | ...................... 10-2005-0045000 |

(51) Int. Cl.
*G03B 21/14* (2006.01)
*G03B 21/22* (2006.01)
*G03B 3/00* (2006.01)
*G03B 21/28* (2006.01)

(52) U.S. Cl. ........................... 353/119; 353/101; 353/81

(58) Field of Classification Search ................. 353/119, 353/33, 41, 57, 58, 61, 81, 84, 98, 101, 99, 353/100; 359/642–830
See application file for complete search history.

(56) References Cited

U.S. PATENT DOCUMENTS

| 5,434,632 | A * | 7/1995 | Carmichael .................. 353/101 |
| 5,806,950 | A * | 9/1998 | Gale et al. ...................... 353/78 |
| 6,144,503 | A * | 11/2000 | Sugano ........................ 359/749 |
| 6,301,058 | B2 * | 10/2001 | Nagahara .................... 359/650 |
| 6,485,144 | B1 * | 11/2002 | Liao ............................ 352/243 |
| 6,505,940 | B1 | 1/2003 | Gotham et al. .............. 353/119 |
| 6,604,831 | B1 | 8/2003 | Prestigomo et al. ......... 353/119 |
| 6,739,831 | B2 * | 5/2004 | Hsu et al. ...................... 415/60 |
| 7,367,682 | B2 * | 5/2008 | Dvorkis et al. .............. 353/101 |

(Continued)

FOREIGN PATENT DOCUMENTS

JP 06-202064 7/1994

(Continued)

OTHER PUBLICATIONS

Korean Office Action dated Jul. 10, 2006.

(Continued)

*Primary Examiner*—William C Dowling
*Assistant Examiner*—Ryan Howard
(74) *Attorney, Agent, or Firm*—Ked & Associates, LLP

(57) ABSTRACT

A thin projector is disclosed. The thin projector includes a housing having an upright panel shape, an illumination unit arranged in the interior of the housing, the illumination unit generating light and emitting the generated light, a micro device arranged in the interior of the housing, the micro device receiving the light from the illumination unit and producing an image using the received light, and a projection lens unit arranged in the interior of the housing, the projection lens unit including an emission unit adapted to externally emit the image produced by the micro device and arranged to be externally exposed through a front side of the housing.

27 Claims, 24 Drawing Sheets

U.S. PATENT DOCUMENTS

| | | | | |
|---|---|---|---|---|
| 2002/0021505 | A1* | 2/2002 | Lee | 359/834 |
| 2002/0176054 | A1 | 11/2002 | Mihalakis | 353/31 |
| 2004/0114115 | A1* | 6/2004 | Runco | 353/101 |
| 2004/0189954 | A1* | 9/2004 | Kuroda | 353/61 |
| 2005/0057542 | A1* | 3/2005 | Plut | 345/204 |
| 2005/0110961 | A1* | 5/2005 | Oross et al. | 353/119 |
| 2006/0132727 | A1* | 6/2006 | Kim et al. | 353/102 |

FOREIGN PATENT DOCUMENTS

| | | |
|---|---|---|
| JP | 2003-084366 | 3/2003 |
| JP | 2003-248271 | 9/2003 |
| KR | 2000-0015666 | 8/2000 |
| KR | 10-2002-0082958 A | 11/2002 |
| KR | 10-2004-0022976 A | 3/2004 |
| KR | 10-2004-0072424 A | 8/2004 |

OTHER PUBLICATIONS

Korean Office Action dated Apr. 28, 2006.
International Search Report.
Korean Office Action dated Sep. 28, 2006.

* cited by examiner

Air outlet

Function button

Input/Output terminal

Air inlet

THIN PROJECTOR

This application claims the benefit of the Korean Patent Applications No. 10-2004-0109323 filed on Dec. 21, 2004, No. 10-2004-0110193 filed on Dec. 22, 2004 and No. 10-2005-045000 field on May 27, 2005, which is hereby incorporated by reference as if fully set forth herein.

BACKGROUND OF THE INVENTION

1. Field of the Invention

The present invention relates to a projector, and more particularly, to a thin projector having a small thickness.

2. Discussion of the Related Art

The present invention relates to a projector, and more particularly, to a thin projector having a small thickness.

The recent tendency of display devices is to provide a large screen size as well as lightness and thinness.

Of such display devices, projectors have been greatly highlighted because they can realize a large screen of 100 inches or more.

Such a projector is a display device which projects an image generated from a micro device such as a liquid crystal display (LCD) panel, a liquid crystal on silicon (LCOS) panel, or a digital micromirror device (DMD) panel, onto a screen, thereby displaying the image.

Generally, such a projector is classified into a single panel type, a double panel type, or a triple panel type in accordance with the number of micro devices used in the projector.

In a single panel type projector, white light is separated into color light components in a time-division manner, and the separated color light components are illuminated to a single micro device. In a two-panel type projector, white light is separated into color light components in a space-division and time-division manner, and the color light components are illuminated to two micro devices. In a three-panel type projector, white light is separated into color light components in a space-division manner, and the color light components are illuminated to three micro devices.

FIG. 1 is a schematic view illustrating an arrangement of a general single panel type projector. FIG. 2 is a perspective view illustrating an appearance of the projector shown in FIG. 1.

As shown in FIG. 1, the single panel type projector includes a light source 2, a color wheel 3, a light tunnel 4, illumination lenses 5 and 6, a micro device 7, a prism 8, and a projection lens unit 1.

In the illustrated single panel type projector, light emitted from the light source 2 is separated into red, green, and blue light beams. The separated light beams are modulated to have uniform brightness while passing through the light tunnel 4. The light beams are then incident on the micro device 7 after passing through the illumination lenses 5 and 6 and the prism 8.

The incident light carries an image signal while passing through the micro device 7, and is then projected onto a screen via the prism 8 and projection lens unit 1.

In the conventional projector having the above-mentioned arrangement, the projection lens unit 1 and micro device 7, which serve to externally emit light in an enlarged state, are arranged in parallel, whereas the lenses 4, 5, and 6 and color drum 3, which transfer light from the light source 2, are arranged perpendicularly to the projection lens unit 1.

Due to such arrangements, the optical elements of the conventional projector are arranged in a U shape. As a result, the conventional projector has an increased thickness.

That is, the conventional projector generally has a rectangular hexahedral appearance such that the top/bottom side thereof has an area larger than that of the front side thereof where the projection lens unit is arranged, as shown in FIG. 2.

As a result, the conventional projector has a problem in that there is a limitation to the installation space of the projector because an increased space must be provided in rear of the front side of the projector where the projection lens unit is arranged.

In order to solve this problem, conventional projectors use an optical system configured to bend the path of light using mirrors. In such projectors, however, there is still a limitation in reducing the projector thickness.

SUMMARY OF THE INVENTION

Accordingly, the present invention is directed to a thin projector that substantially obviates one or more problems due to limitations and disadvantages of the related art.

An object of the present invention devised to solve the above-mentioned problems lies in providing a thin projector which includes an optical system having an arrangement capable of minimizing the space of the optical system, thereby reducing the thickness of the projector.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a thin projector comprises: a housing having a panel shape including a front side, a rear side, a top side, and opposite lateral sides; an illumination unit arranged in the interior of the housing, the illumination unit generating light and emitting the generated light; a micro device arranged in the interior of the housing, the micro device receiving the light from the illumination unit and producing an image using the received light; a projection lens unit arranged in the interior of the housing, the projection lens unit including an emission unit adapted to externally emit the image produced by the micro device and arranged to be externally exposed through the front side of the housing; and fixing means adapted to fix the housing such that the housing is arranged in an upright state.

The housing may be attached to a wall or a ceiling by the fixing means.

Each lateral side of the housing may have an area smaller than an area of the front or rear side of the housing.

The top or bottom side of the housing may have an area smaller than an area of the front or rear side of the housing.

The front side of the housing may have horizontal and vertical lengths which are equal to or different from each other.

The projection lens unit may comprise a first lens set adapted to emit light carrying the image produced from the micro device, a second lens set arranged perpendicularly to a central axis of the light emitted from the first lens set, and adapted to project the light emitted from the first lens set onto a screen, and a reflector arranged between the first lens set and the second lens set, and adapted to change the light emitted from the first lens set such that the light emitted from the first lens set is incident on the second lens set.

The first lens set may comprise at least one focusing lens which is shiftable perpendicularly to a central axis of light emitted from the second lens set, to adjust a focus of the image.

The second lens set may comprise at least one zoom lens which is shiftable perpendicularly to the central axis of the light emitted from the first lens set, to adjust a focus of the image.

The reflector may comprise a fully-reflective mirror or a prism.

The central axis of the light emitted from the first lens set may be perpendicular to a central axis of light emitted from the second lens set. The first and second lens sets may be arranged perpendicularly to an image display face of the micro device.

The projection lens unit may be shiftable in a vertical direction of the front side of the housing, to adjust a position of the image projected onto a screen.

The illumination unit may comprise a light source adapted to generate light, a first illumination lens set adapted to provide a uniform brightness of the light generated from the light source, a second illumination lens set adapted to converge light emitted from the first illumination lens set, and a prism adapted to cause light emitted from the second illumination lens set to be incident on the micro device, and to cause light emitted from the micro device to be incident on the projection lens unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Reference will now be made in detail to the preferred embodiments of the present invention, examples of which are illustrated in the accompanying drawings.

The concept of the present invention is to reduce the installation space of a projector by configuring an optical system of the projector such that the thickness of the projector is reduced.

Figure 1:
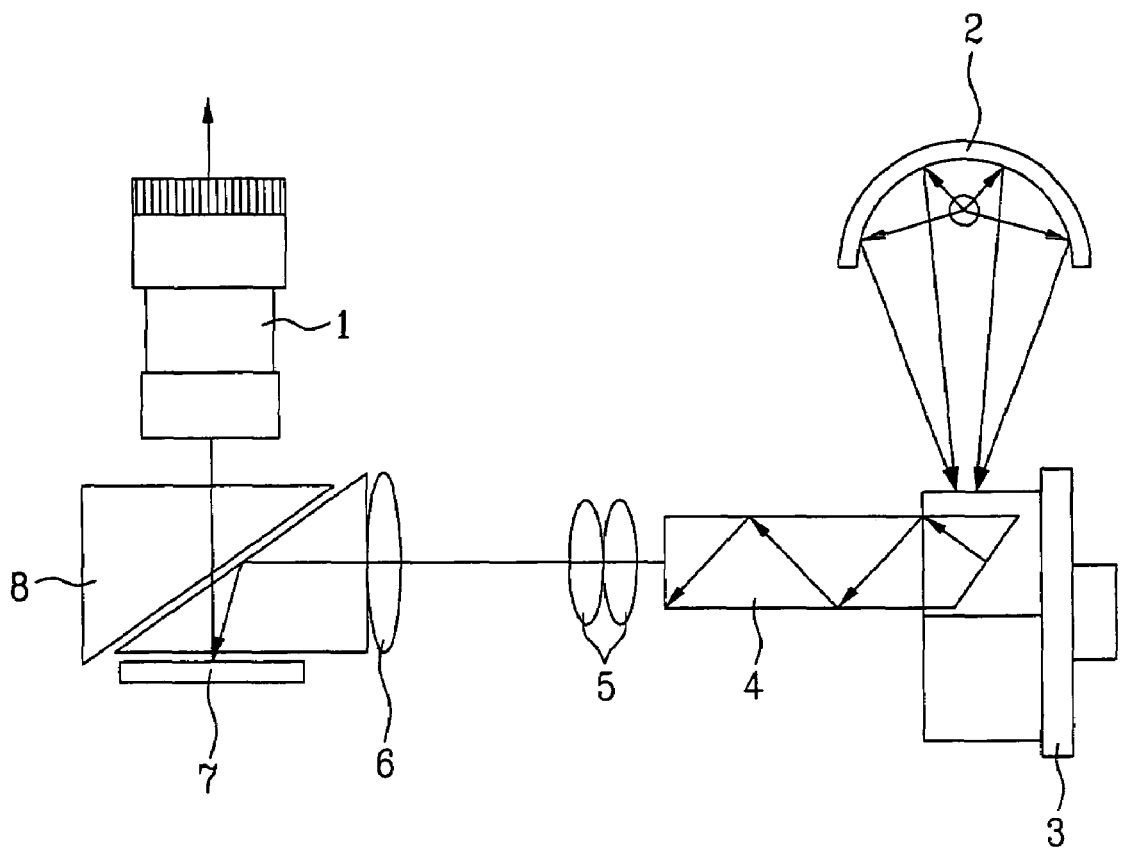
FIG. 1 is a schematic view illustrating an arrangement of a general single panel type projector.
Figure 2:
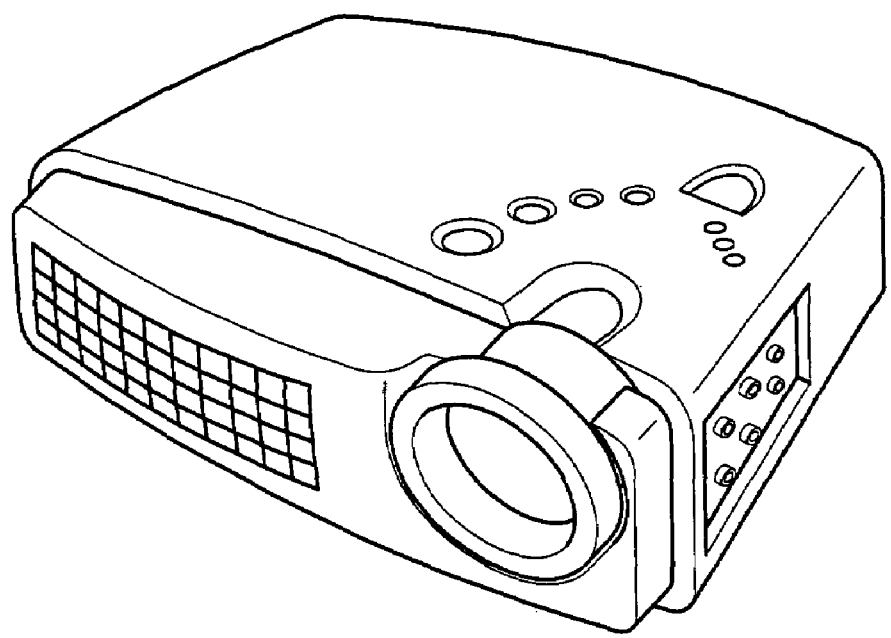
FIG. 2 is a perspective view illustrating an appearance of the projector shown in FIG. 1.
Figure 3A:
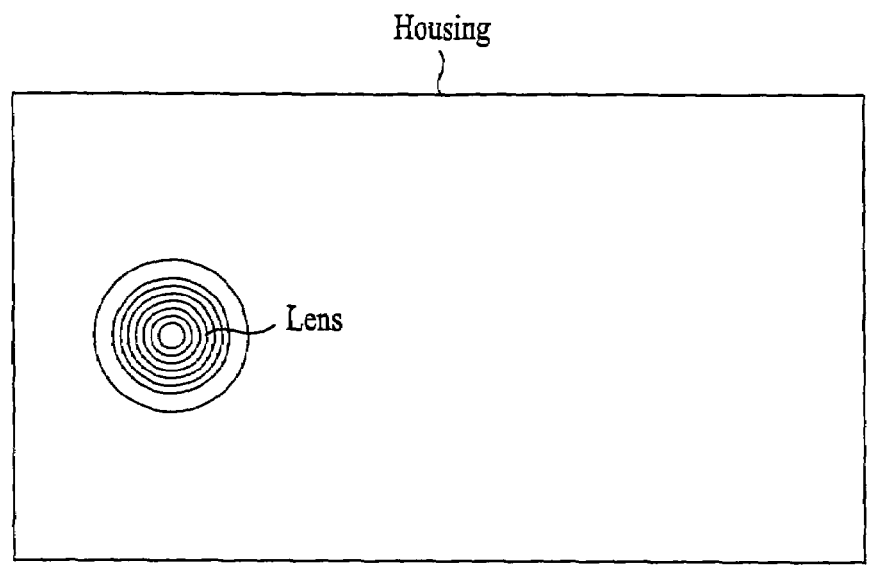
FIG. 3A is a front view illustrating a front side of a thin projector according to the present invention.
Figure 3B:
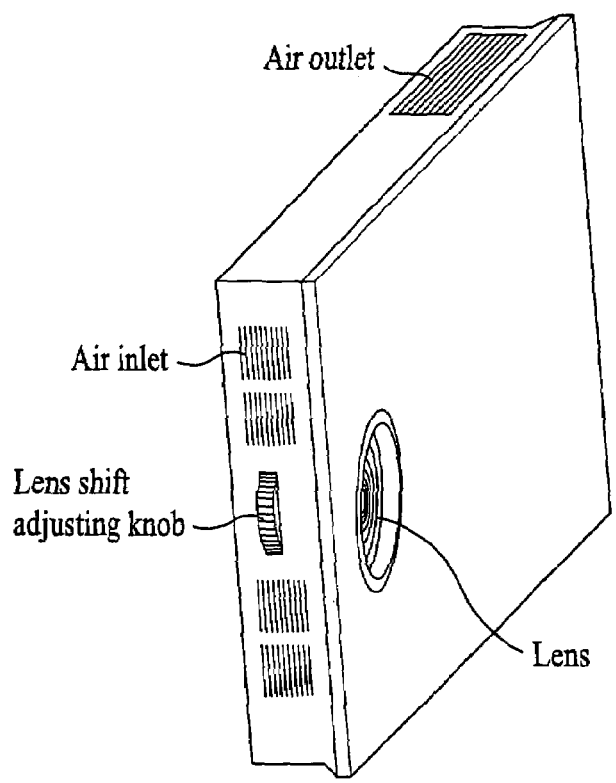
FIGS. 3B and 3C are perspective views illustrating opposite lateral sides of the thin projector according to the present invention, respectively.
Figure 3C:
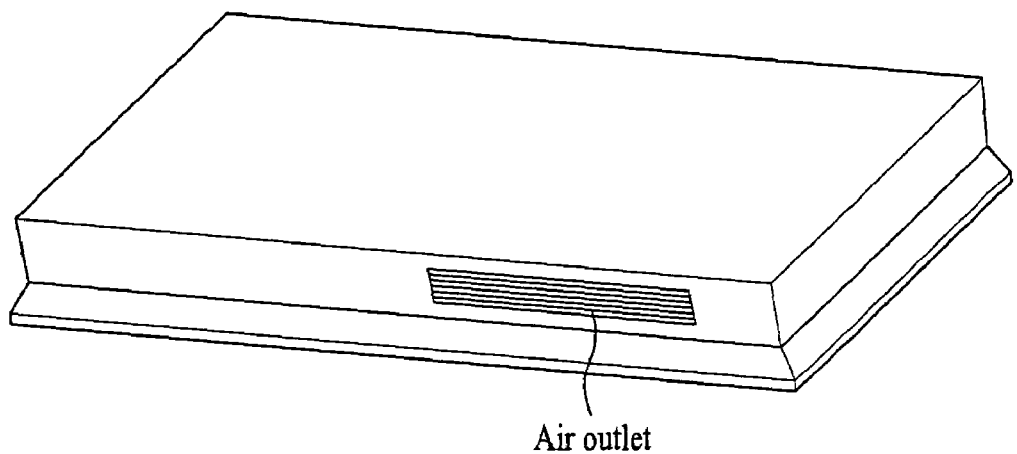
Figure 3D:
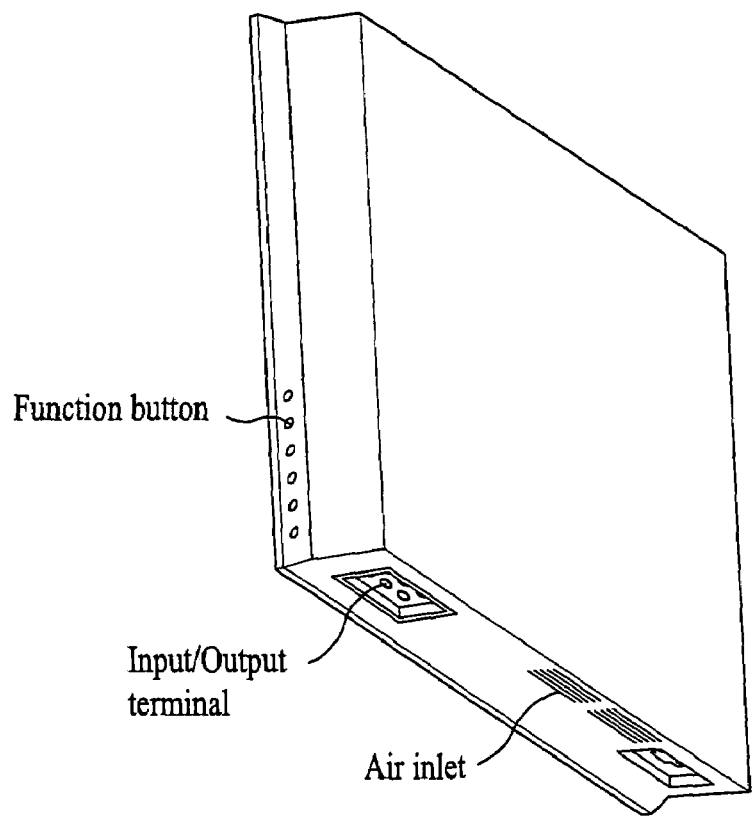
FIGS. 3D and 3E are perspective views illustrating top and bottom sides of the thin projectors according to the present invention.
Figure 3E:
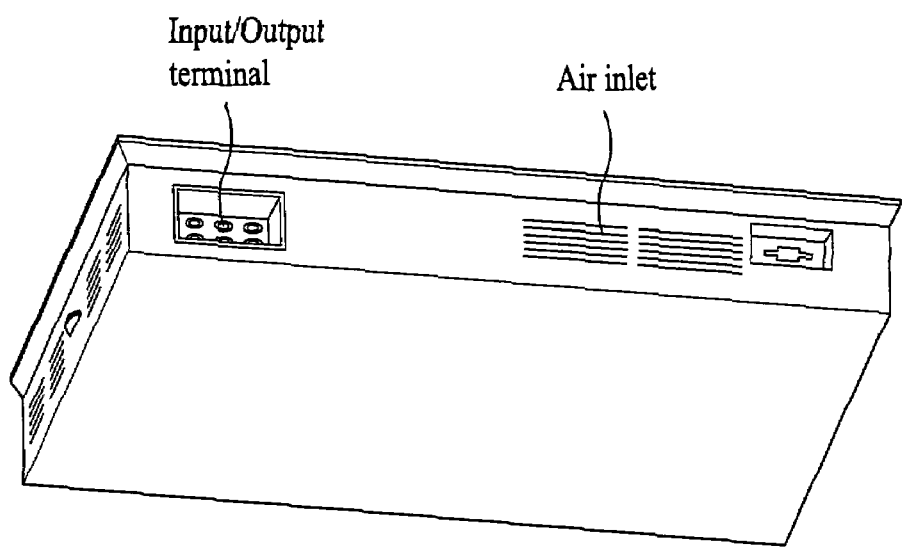

FIG. 3A is a front view illustrating a front side of a thin projector according to the present invention. FIGS. 3B and 3C are perspective views illustrating opposite lateral sides of the thin projector according to the present invention, respectively. FIGS. 3D and 3E are perspective views illustrating top and bottom sides of the thin projectors according to the present invention.

As shown in FIGS. 3A to 3E, the thin projector of the present invention mainly includes a projection lens unit, a micro device, and an illumination unit. The projector also includes a housing which protects the constituent elements of the projector. The housing has a panel shape, and is fixed in an upright state by a fixing means.

The housing may be configured such that each lateral side of the housing has an area smaller than the area of the front or rear side of the housing, or the top or bottom side of the housing has an area smaller than the area of the front or rear side of the housing.

The front and rear sides of the housing may have the same area or different areas. The front side of the housing may have horizontal and vertical lengths which are identical to or different from each other.

It is preferred that the housing has a thickness corresponding to 50% or less of the horizontal length of the housing.

The projection lens unit is arranged in the housing, and includes a lens arranged at a predetermined region of the front side of the housing such that the lens is outwardly exposed from the housing, to project an image onto a screen arranged in front of the projector.

The micro device reproduces an image, and transmits the reproduced image to the projection lens unit. The illumination unit generates light, and emits the generated light to the micro device.

Detailed description of the projection lens unit, micro device, and illumination unit will be described hereinafter.

Figure 4:
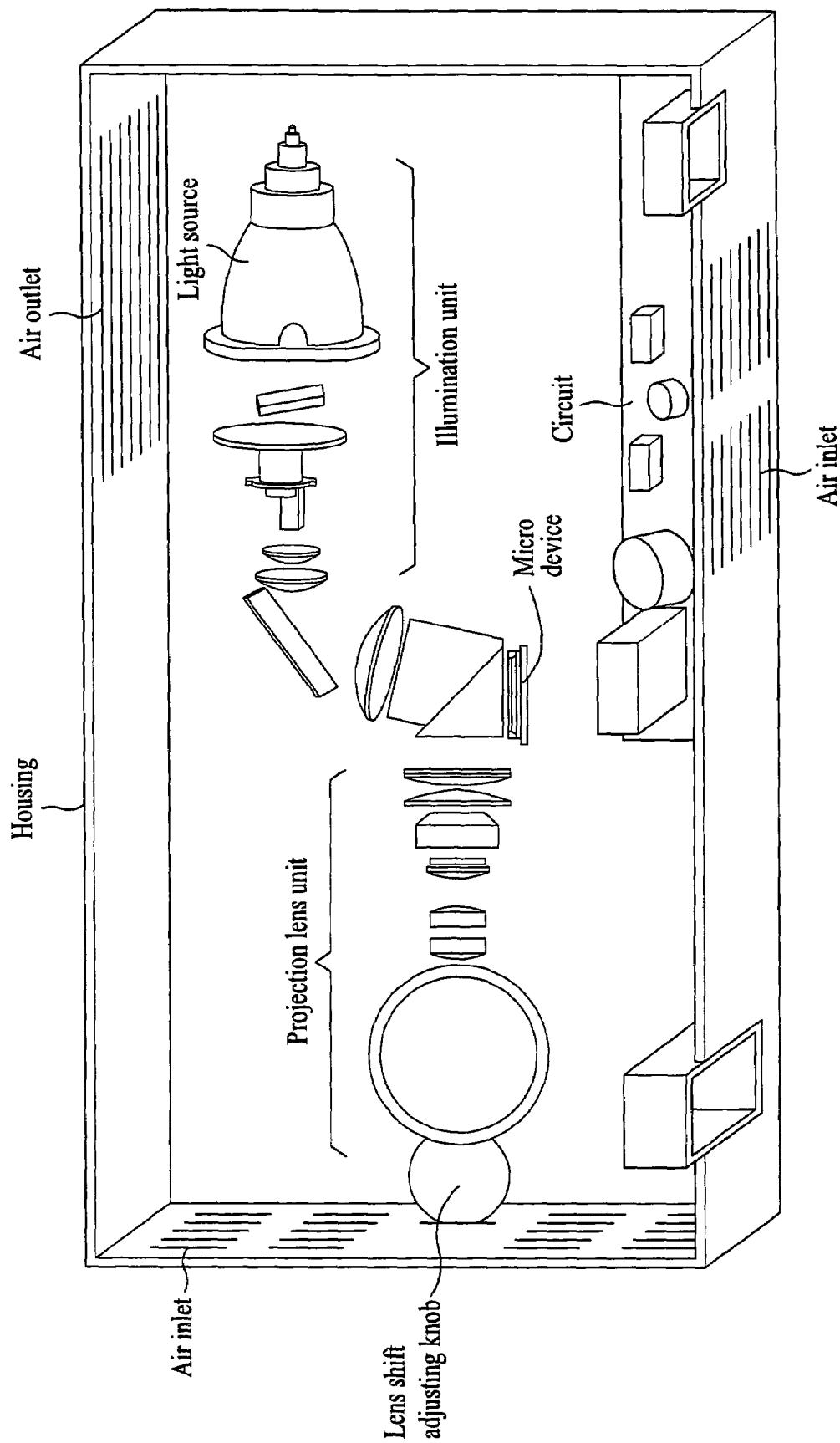
FIG. 4 is a perspective view illustrating the interior of the thin projector according to the present invention.

FIG. 4 is a perspective view illustrating the interior of the thin projector according to the present invention.

As shown in FIG. 4, it is preferred that, in the thin projector of the present invention, the projection lens unit be arranged at one lateral side of the housing, the illumination unit be arranged at the top side of the housing, and a driving circuit, which drives the projection lens unit, illumination unit, and micro device, be arranged at the bottom side of the housing.

A lens shift adjusting screw is outwardly exposed from one lateral side of the housing where the projection lens unit is arranged. The lens shift adjusting screw serves to shift the projection lens unit.

It is also preferred that air inlets be formed at the lateral side of the housing where the projection lens unit is arranged and at the bottom side of the housing in a region where the driving circuit is arranged, respectively. Also, it is preferred that an air outlet be arranged at the top side of the housing in a region where the illumination unit is arranged.

A light source, which is included in the illumination unit, may be arranged beneath the air outlet. The reason why the light source is arranged beneath the air outlet is that rapid and efficient cooling can be achieved where the light source is arranged near the air outlet because the light source generates a large amount of heat, as compared to other elements.

If the projector is installed such that the housing is arranged in an inverted state or is unstably arranged, there may be a danger of fire due to the light source which generates a large amount of heat.

Therefore, it is preferred that a sensor be installed in a housing to sense the inclination of the housing, and thus, to cut off electric power supplied to the illumination unit when the inclination of the housing is higher than a reference inclination.

The sensor may be a gravity sensor such as a gyro sensor.

In order to achieve an enhancement in the cooling efficiency of the projector, fans are installed over and beneath the projection lens unit and beneath the illumination unit, respectively.

In the illustrated case, there are a plurality of fans, namely, a first fan arranged over the projection lens unit, a second fan arranged beneath the projection lens unit, a third fan arranged beneath an illumination lens set of the illumination unit, and a fourth fan arranged beneath the light source of the illumination unit.

Accordingly, air is introduced into the interior of the projector through the air inlets arranged at one lateral side and bottom side of the projector by the first and second fans, respectively, and is then discharged through the air outlet arranged at the top side of the projector by the third and fourth fans. In a particular air flow path design, the number of the fans may be adjusted to efficiently cool the projector.

Hereinafter, the optical system of the thin projector according to the present invention will be described.

Although a variety of optical systems may be applied to the thin projector of the present invention in order to realize a desired thickness reduction of the thin projector, an "I"-shaped optical system or "L"-shaped optical system may be applied to the thin projector in accordance with an embodiment of the present invention.

Figure 5A:
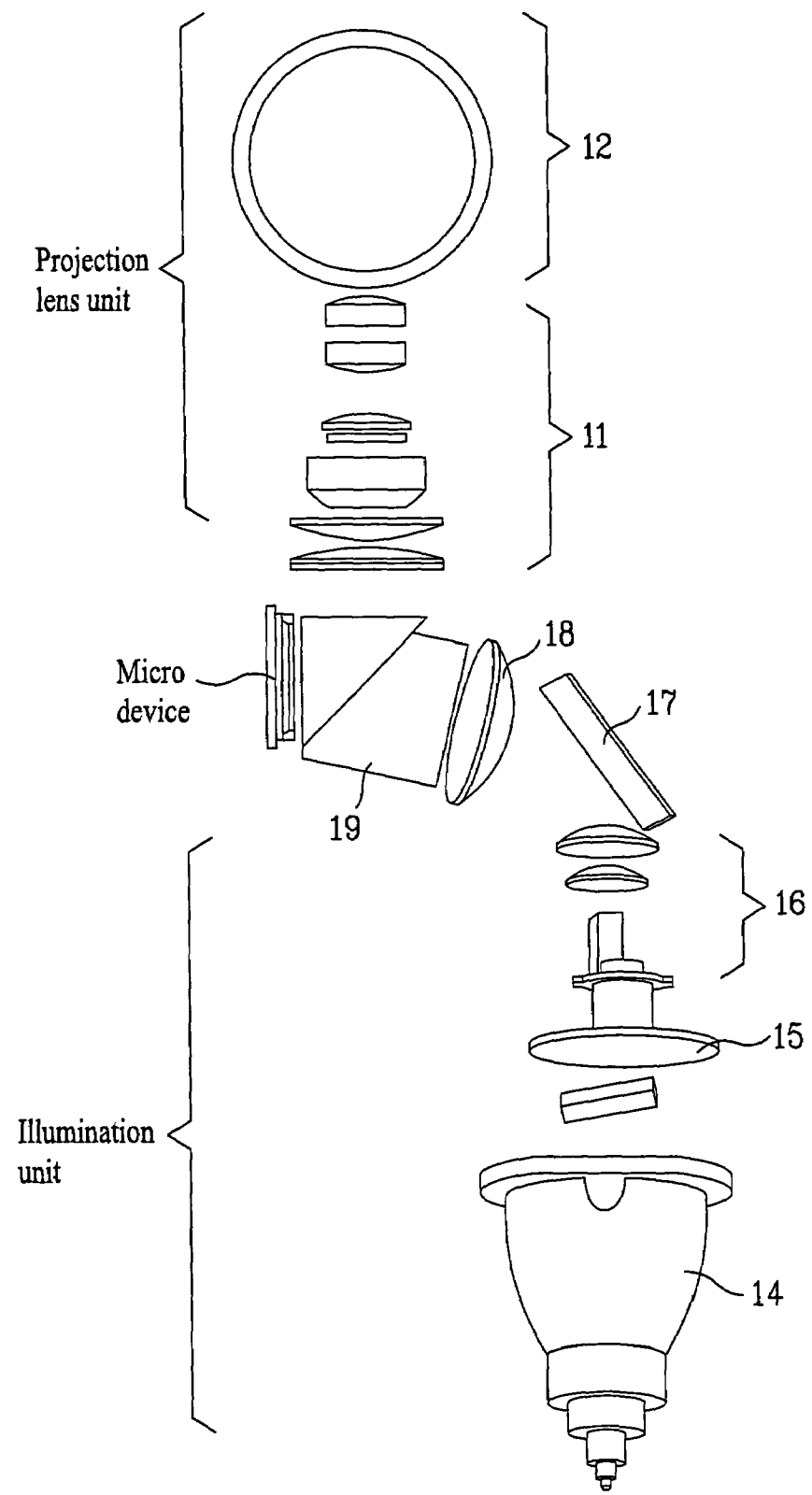
FIG. 5A is a front view illustrating an "I"-shaped optical system which is included in the thin projector according to the present invention.
Figure 5B:
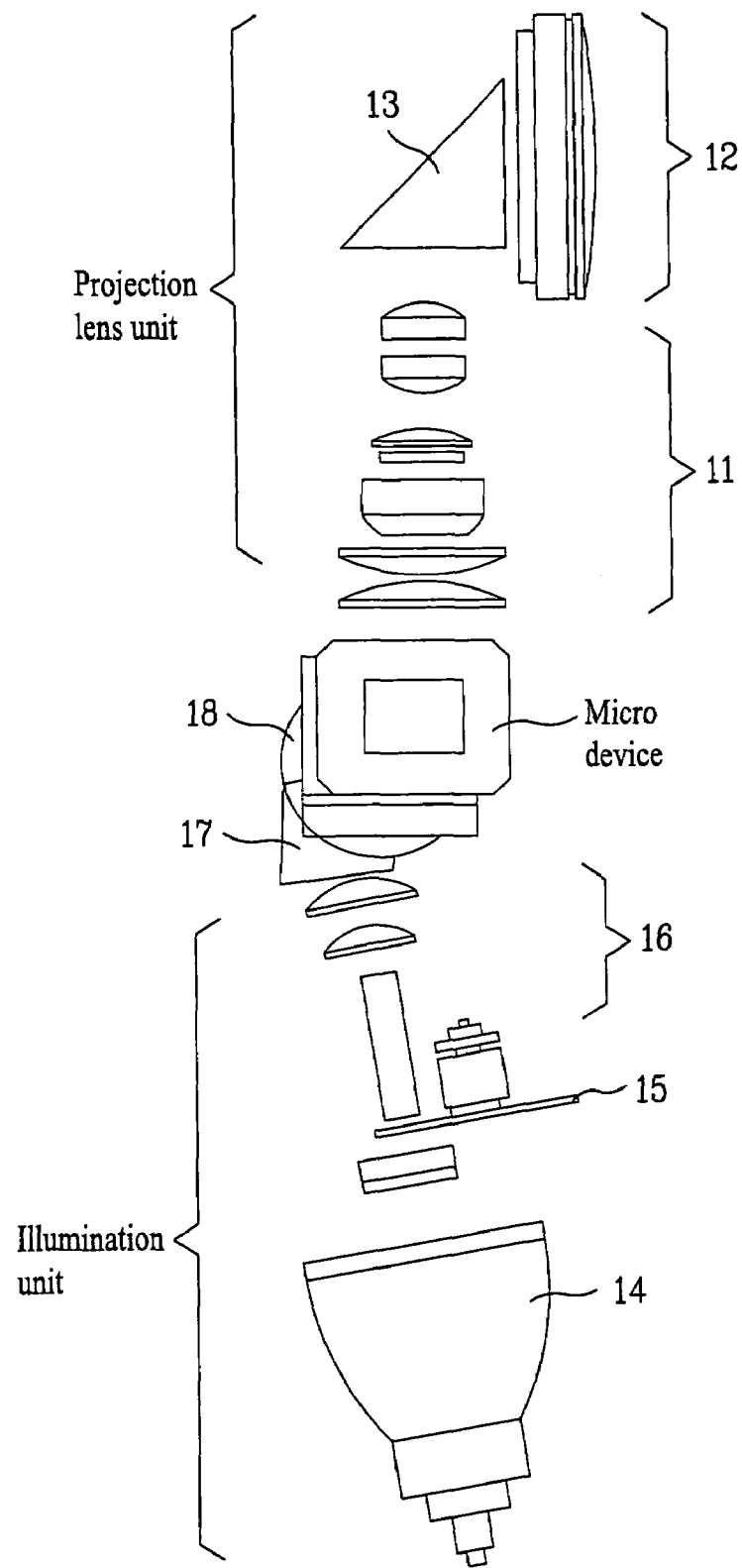
FIG. 5B is a side view illustrating the "I"-shaped optical system which is included in the thin projector according to the present invention.
Figure 6A:
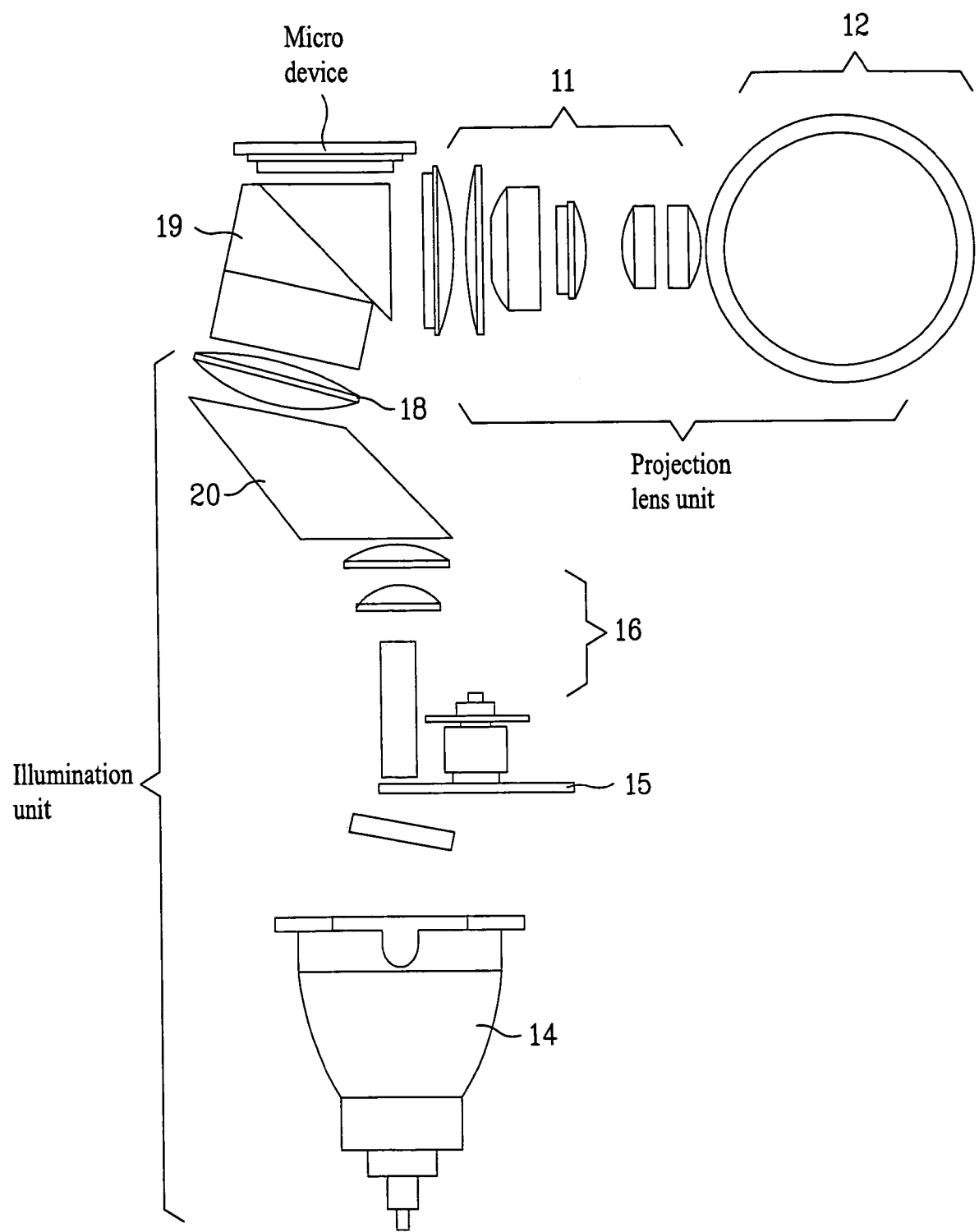
FIG. 6A is a front view illustrating an "L"-shaped optical system which is included in the thin projector according to the present invention.
Figure 6B:
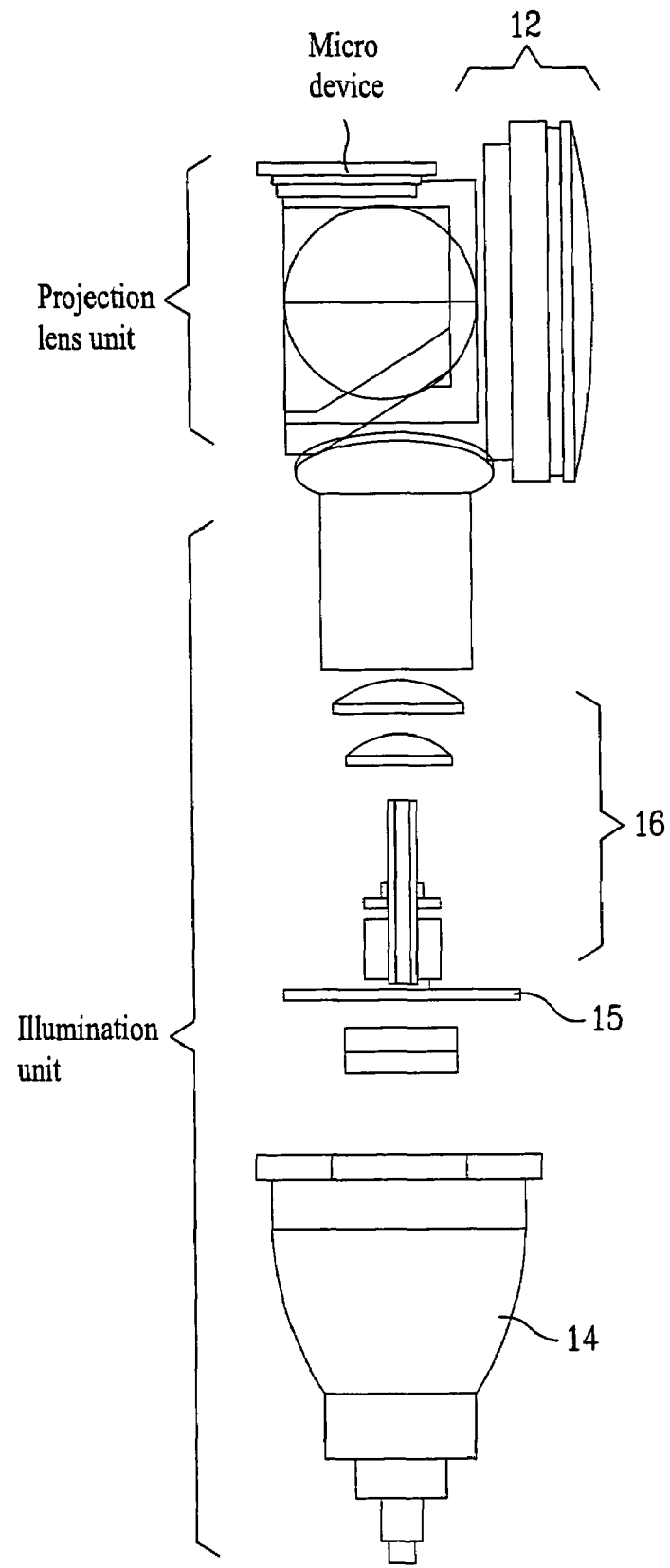
FIG. 6B is a side view illustrating the "L"-shaped optical system which is included in the thin projector according to the present invention.

FIG. 5A is a front view illustrating an "I"-shaped optical system which is included in the thin projector according to the present invention. FIG. 5B is a side view illustrating the "I"-shaped optical system which is included in the thin projector according to the present invention. FIG. 6A is a front view illustrating an "L"-shaped optical system which is included in the thin projector according to the present invention. FIG. 6B is a side view illustrating the "L"-shaped optical system which is included in the thin projector according to the present invention.

As shown in FIGS. 5A, 5B, 6A, and 6B, the optical system of the thin projector according to the present invention mainly includes a projection lens unit, a micro device, and an illumination unit in either case of FIGS. 5A and 5B or FIGS. 6A and 6B.

The projection lens unit includes a first lens set 11, a second lens set 12, and a reflector 13.

The first lens set 11 functions to emit light carrying an image generated from the micro device. The second lens set 12 is arranged perpendicularly to the central axis of the light emitted from the first lens set 11, to project the light emitted from the first lens set 11 onto an external screen.

The reflector 13 is arranged between the first lens set 11 and the second lens set 12, to change the direction of the light emitted from the first lens set 11 such that the light is incident on the second lens set 12.

The first lens set 11 is shiftable perpendicularly to the central axis of the light emitted from the second lens set 12. The first lens set 11 may include at least one focusing lens which adjusts the focus of the image incident thereon.

The second lens set 12 is shiftable perpendicularly to the central axis of the light emitted from the first lens set 11. The second lens set 12 may include at least one zoom lens which adjusts the focus of the image incident thereon.

The entire portion of the projection lens unit, which includes the first and second lens sets 11 and 12, is shiftable in a vertical direction of the front side of the housing, to adjust the position of the image projected onto the screen.

Figure 7:
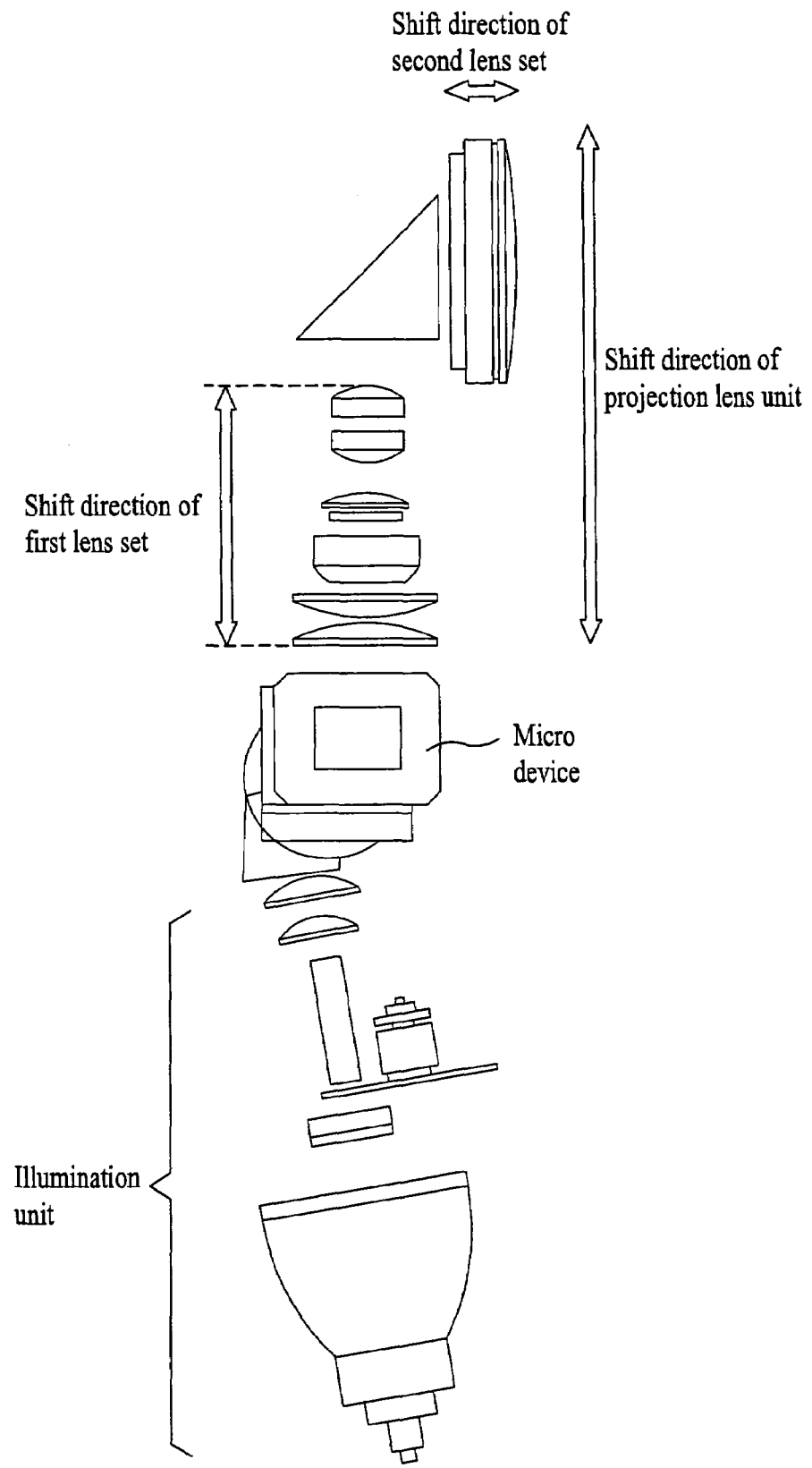
FIG. 7 is a schematic view illustrating the shift direction of a projection lens unit in the thin projector according to the present invention.

FIG. 7 is a schematic view illustrating the shift direction of the projection lens unit in the thin projector according to the present invention. As shown in FIG. 7, the first lens set 11 is shiftable perpendicularly to the optical axis of the second lens set 12, and the second lens set 12 is shiftable perpendicularly to the optical axis of the first lens set 11.

The entire portion of the projection lens unit including the first and second lens sets 11 and 12 is shiftable perpendicularly to the optical axis of the second lens set 12, to adjust the position of the image projected onto the screen.

The reflector 13 may include a fully-reflective mirror or prism.

In accordance with the present invention, the first and second lens sets 11 and 12 are arranged such that the central axis of the light emitted from the first lens set 11 is perpendicular to the central axis of the light emitted from the second lens set 12.

It is preferred that the first and second lens sets 11 and 12 be arranged perpendicular to an image display face of the micro device.

The micro device may be an LCD panel, an LCOS panel, or a DMD panel.

Meanwhile, the illumination unit may include a light source 14, a first illumination lens set 16, a second illumination lens set 18, and a first prism 19.

The first illumination lens set 16 functions to provide a uniform brightness of light emitted from the light source 14. The second illumination lens set 18 functions to converge the light emitted from the first illumination lens set 16.

The first illumination lens set 16 may include a light tunnel which functions to provide a uniform brightness of light, and at least one condensing lens. The second illumination lens set 18 may include at least one condensing lens which functions to converge light.

The first prism 19 functions to cause the light emitted from the second illumination lens set 18 to be incident on the micro device, and to cause the light emitted from the micro device to be incident on the first lens set of the projection lens unit.

The first prism 19 may be a total internal reflection (TIR) prism. It is preferred that the first prism 19 be arranged over the image display face of the micro device.

The illumination unit may further include a color wheel 15 which is arranged between the light source 14 and the first illumination lens set 16, to separate the light emitted from the light source 14 into color light components, and a mirror 17 or a second prism 20 which is arranged between the first illumination lens set 16 and the second illumination lens set 18, to reflect the light emitted from the first illumination lens set 16 to the second illumination lens set 18.

In the "I"-shaped optical system shown in FIG. 5A, the mirror 17 is used. The second prism 20 is used in the "L"-shaped optical system shown in FIG. 6a.

The reason why the mirror 17 or second prism 20 is used is to arrange the first and second illumination lens sets 16 and 18 on different optical axes, respectively, in order to reduce the total length of the projector.

That is, the light source 14 and the first illumination lens set 16 are arranged on the same optical axis, and the first and second illumination lens sets 16 and 18 are arranged on different optical axes, respectively.

The optical axis of light emitted from the first illumination lens set 16 is bent through a predetermined angle from the optical axis of light emitted from the second illumination lens set 18.

The second illumination lens set 16 and the first prism 19 are arranged on the same optical axis, in order to enable uniform incidence of light on the first prism 19.

The first illumination lens set 16 and the first lens set 11 of the projection lens unit may be arranged on different optical axes parallel to each other or meeting each other.

The second illumination lens set 16 and the first lens set 11 of the projection lens unit may also be arranged perpendicularly to each other.

The projector according to the present invention may be configured such that the projector is attachable to a wall or a ceiling.

Figure 8A:
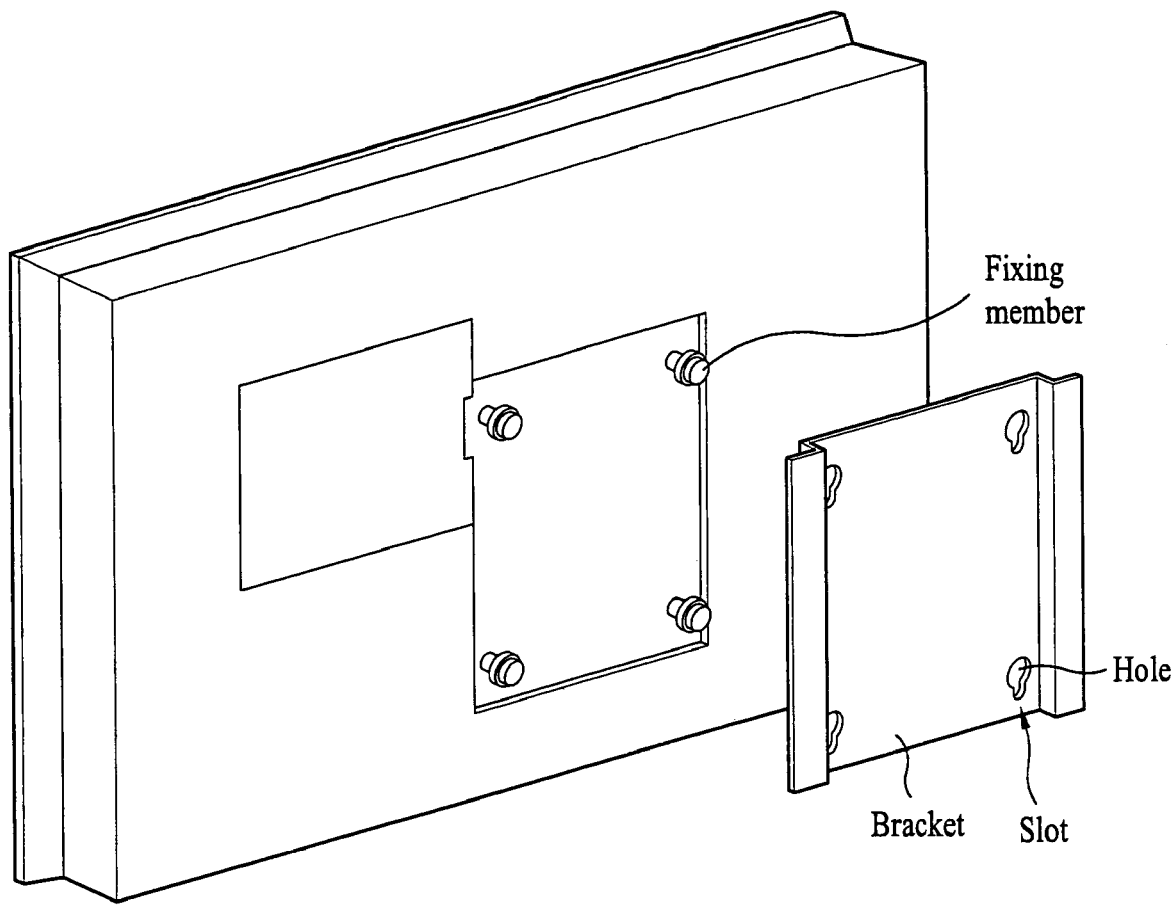
FIG. 8A is a rear view illustrating a wall-mounted thin projector according to an embodiment of the present invention.
Figure 8B:
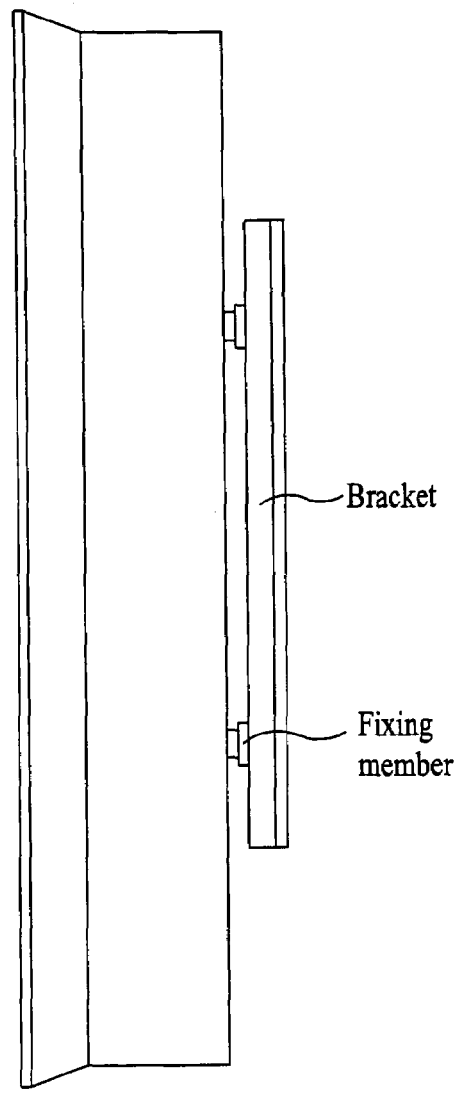
FIG. 8B is a side view corresponding to FIG. 8A.
Figure 8C:
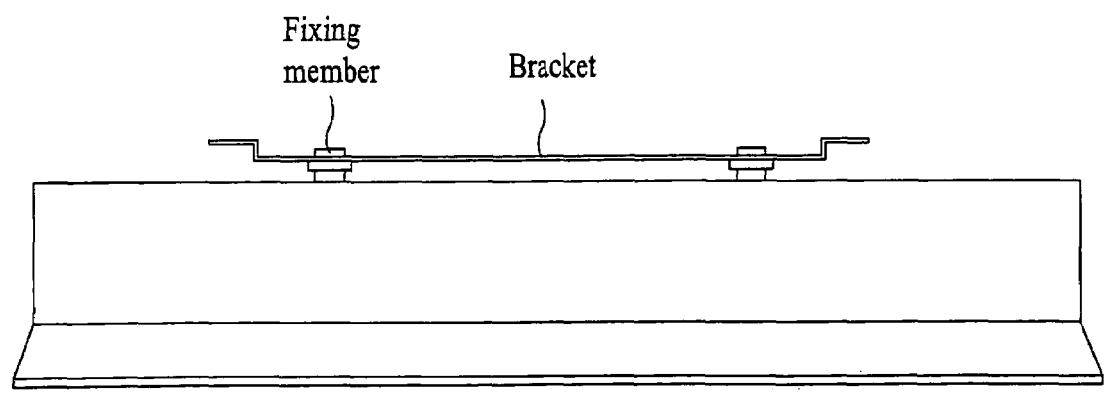
FIG. 8C is a plan view corresponding to FIG. 8A.

FIG. 8A is a rear view illustrating a wall-mounted thin projector according to an embodiment of the present invention. FIG. 8B is a side view corresponding to FIG. 8A. FIG. 8C is a plan view corresponding to FIG. 8A.

As shown in FIGS. 8A, 8B, and 8C, a fixing means such as a bracket must be used to mount the projector of the present invention to a wall.

In accordance with an embodiment of the present invention, fixing members are mounted to a rear side of the thin projector, and the bracket is fixed to the fixing members.

The bracket has slotted holes at four corners, respectively, so that the bracket can be fixed to the fixing members.

Figure 9A:
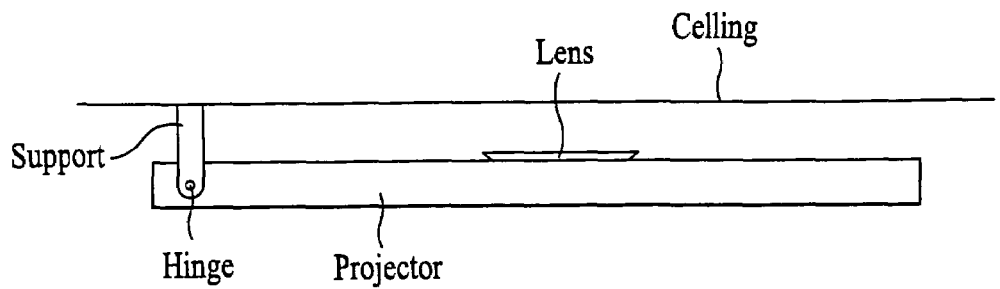
FIGS. 9A and 9B are side views illustrating a ceiling-mounted thin projector according to an embodiment of the present invention.
Figure 9B:
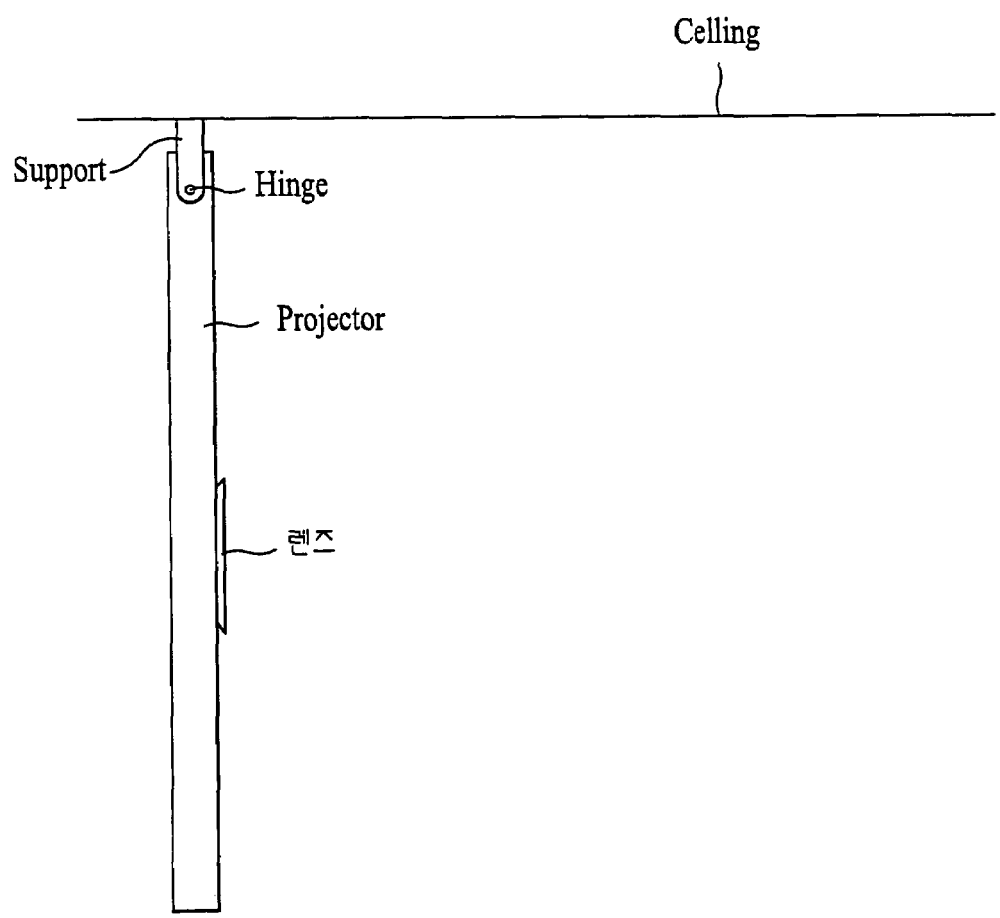

FIGS. 9A and 9B are side views illustrating a ceiling-mounted thin projector according to an embodiment of the present invention. FIG. 9A shows a folded state of the projector in which the projector does not drive, whereas FIG. 9B shows an unfolded state of the projector in which the projector can drive.

As shown in FIGS. 9A and 9B, the projector of the present invention may be attached to a ceiling through a fixing means mounted to the top side of the projector.

In this case, the fixing means may include a support and a hinge, so as to allow the projector to be hingable.

Figure 10A:
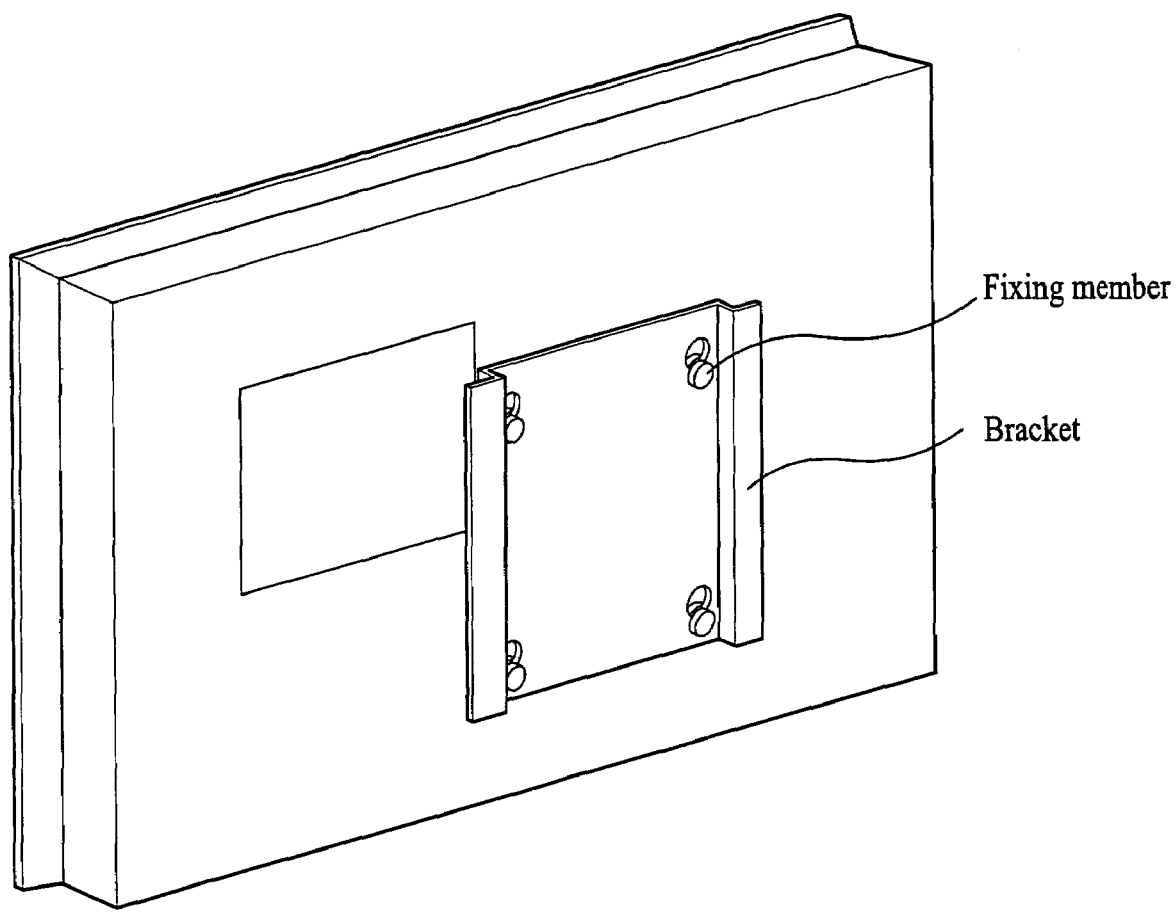
FIGS. 10A and 10B are rear views illustrating a ceiling-mounted thin projector according to another embodiment of the present invention.
Figure 10B:
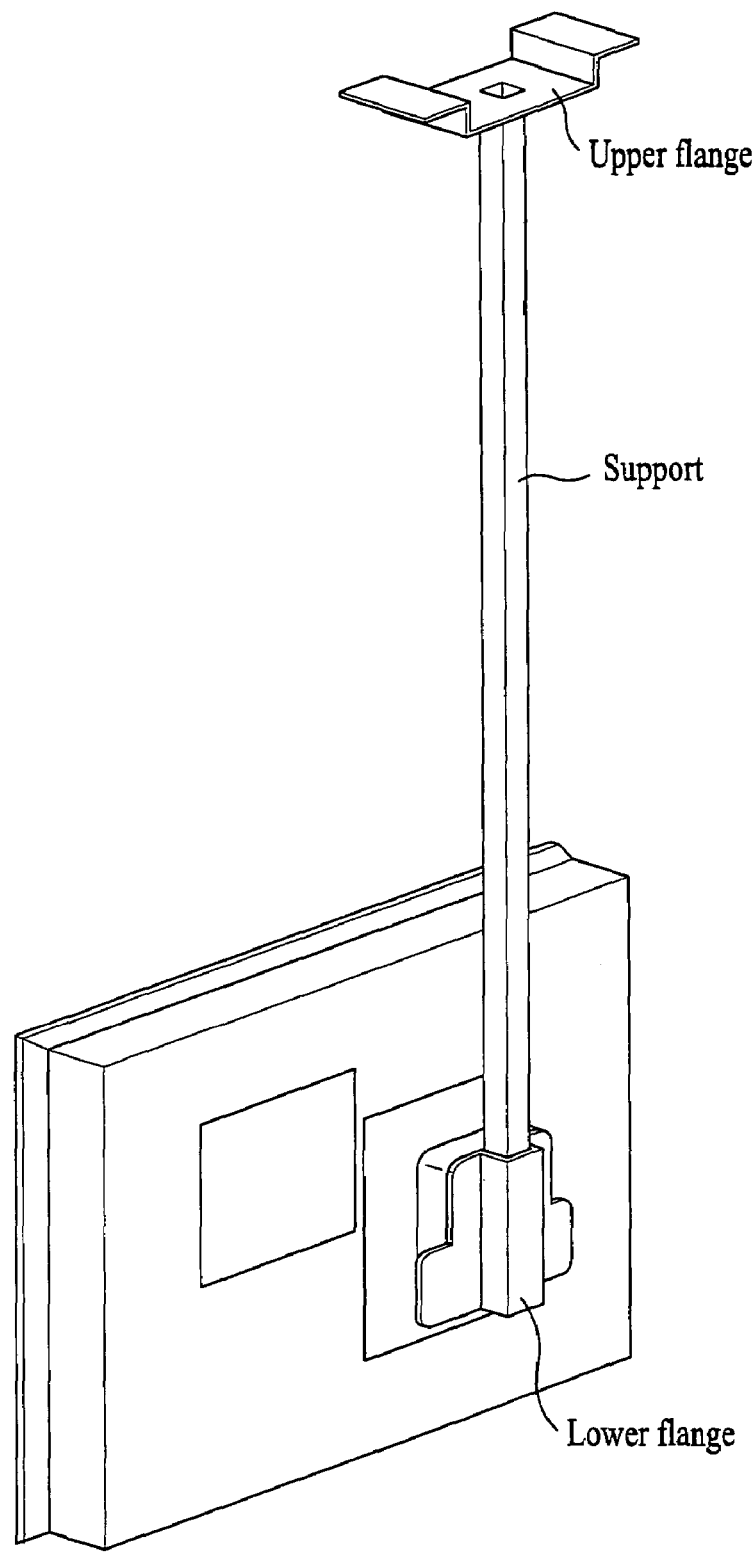

FIGS. 10A and 10B are rear views illustrating a ceiling-mounted thin projector according to another embodiment of the present invention.

As shown in FIGS. 10A and 10B, a support means is mounted to the rear side of the projector in order to mount the projector to a ceiling.

The support means includes a bracket fixed to the rear side of the projector, a low flange connected to the bracket, a support connected to the lower flange, and an upper flange connected to the support, and fixed to a ceiling.

The projector of the present invention may be configured to be installed on a floor in an upright state.

Figure 11A:
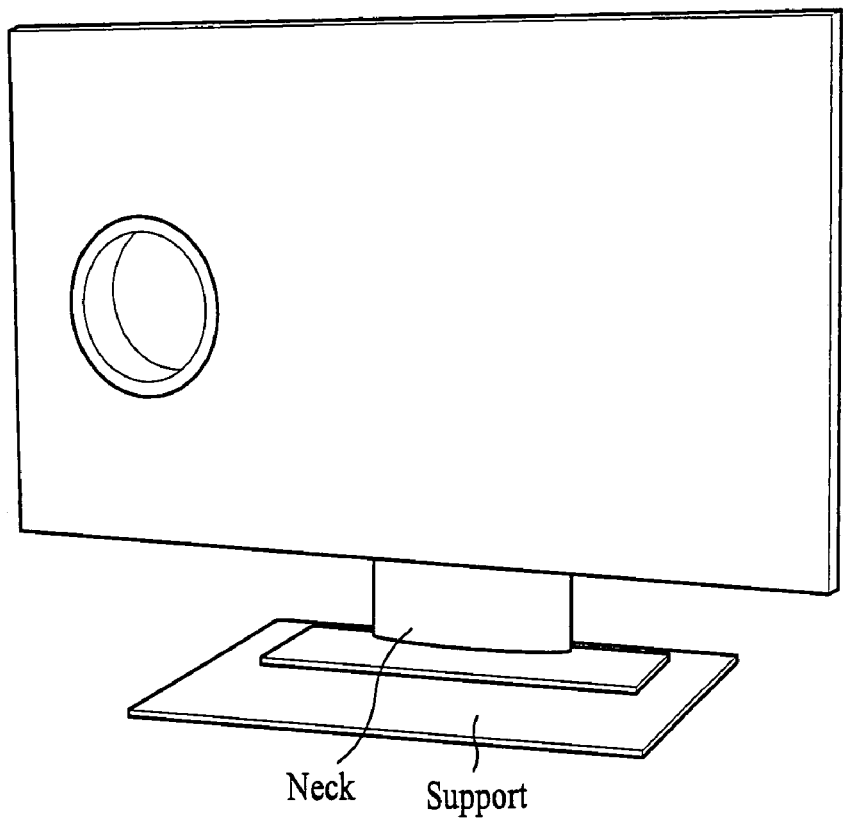
FIG. 11A is a front view illustrating a stand type projector according to an embodiment of the present invention.
Figure 11B:
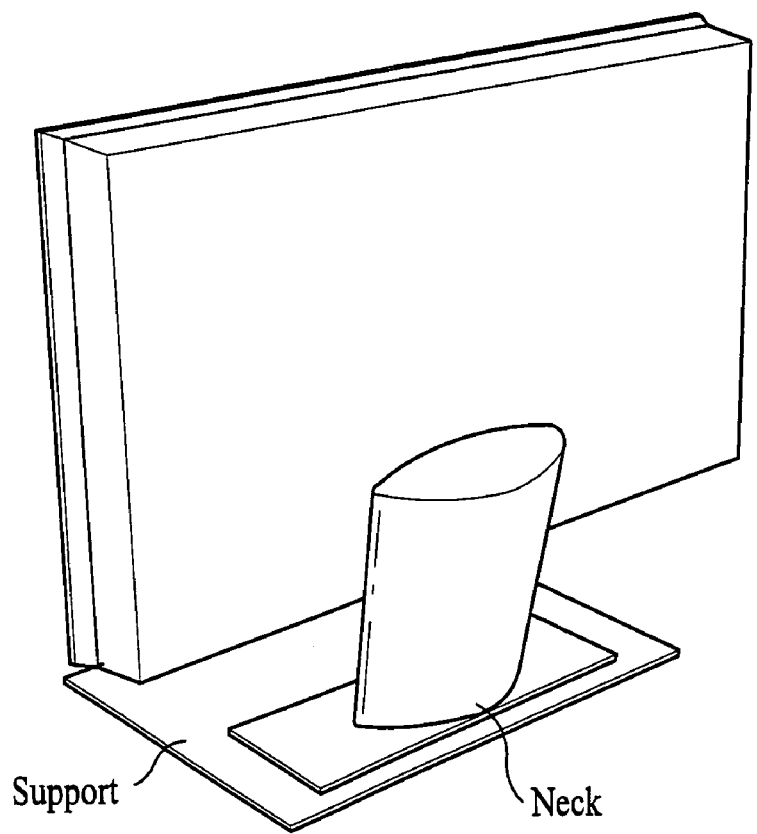
FIG. 11B is a rear view corresponding to FIG. 11A.
Figure 12A:
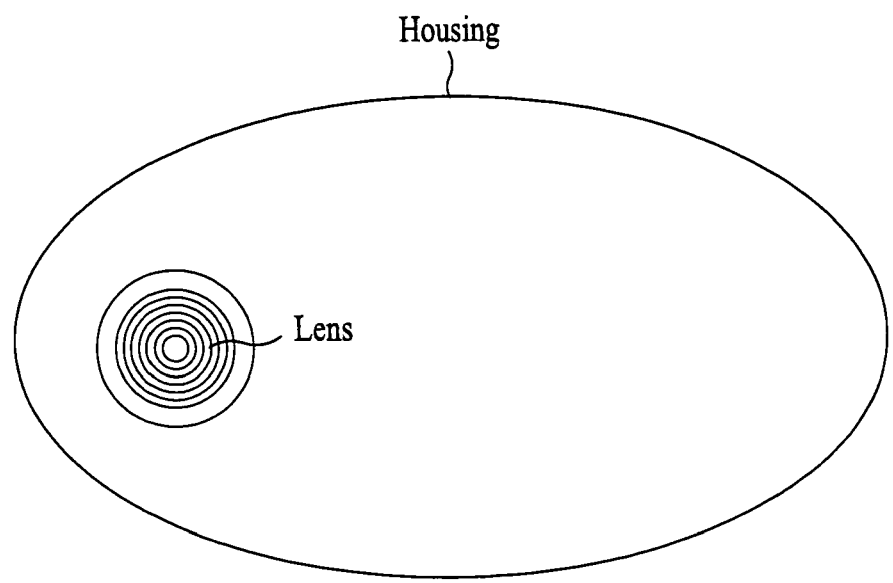
FIGS. 12A to 12D are views illustrating diverse appearances of a thin projector according to the present invention, respectively.
Figure 12B:
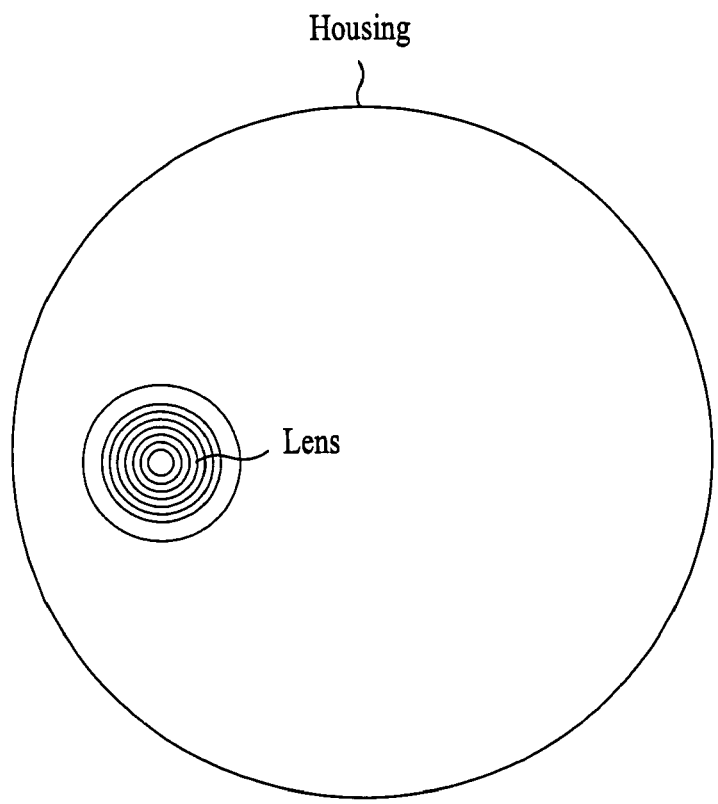
Figure 12C:
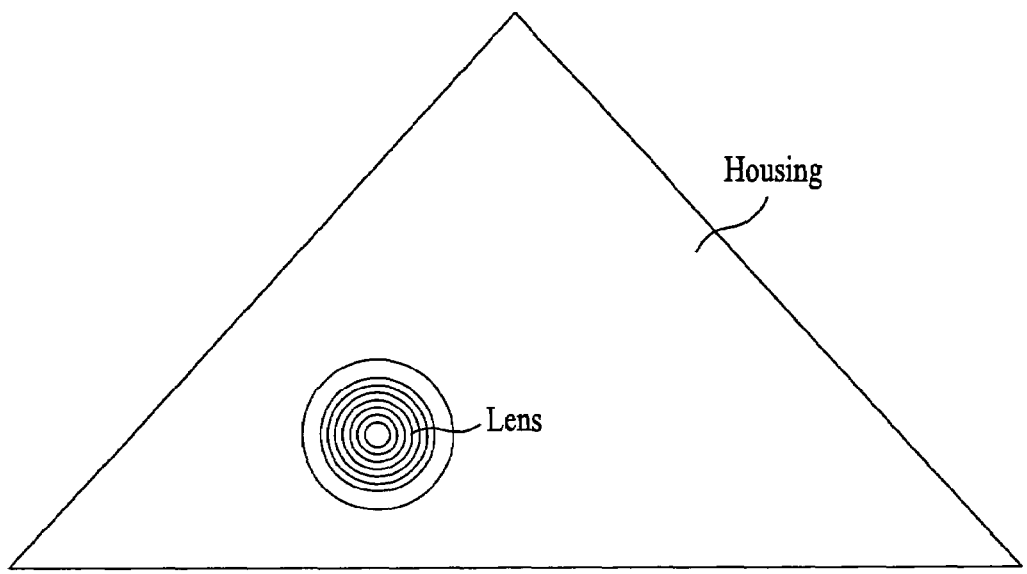
Figure 12D:
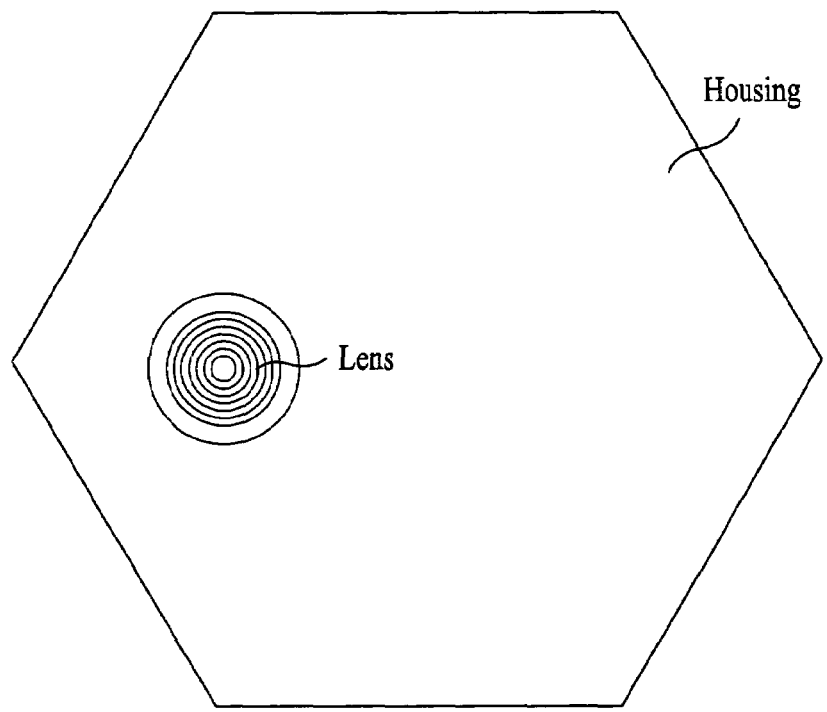

FIG. 11A is a front view illustrating a stand type projector according to an embodiment of the present invention. FIG. 11B is a rear view corresponding to FIG. 11A.

As shown in FIGS. 11A and 11B, the projector of the present invention can be stood on a floor in an upright state by a support means.

In this case, the support means may include a support and a neck. The neck is fixedly mounted to the rear side of the projector.

Meanwhile, the thin projector according to the present invention may be manufactured to have diverse shapes.

For example, as shown in FIGS. 12A to 12D, the thin projector of the present invention may have an oval, circular, triangular, or polygonal shape having a small thickness.

Meanwhile, in accordance with another embodiment of the present invention, the projection lens unit may include four lens sets.

FIGS. 13A to 13D are views illustrating various embodiments of the projection lens unit included in the thin projector according to the present invention, respectively.

As shown in FIGS. 13A to 13D, the projection lens unit includes first, second, third, and fourth lens sets in each case of FIGS. 13A to 13D.

A reflector 13 such as a prism or mirror is arranged between adjacent ones of the first through fourth lens sets, to change the direction of light incident on the projection lens unit.

The first lens set includes at least one focus adjusting lens, and the second lens set includes at least one zoom lens. The third lens set includes at least compensation lens, and the fourth lens set includes at least one master lens.

Figure 13A:
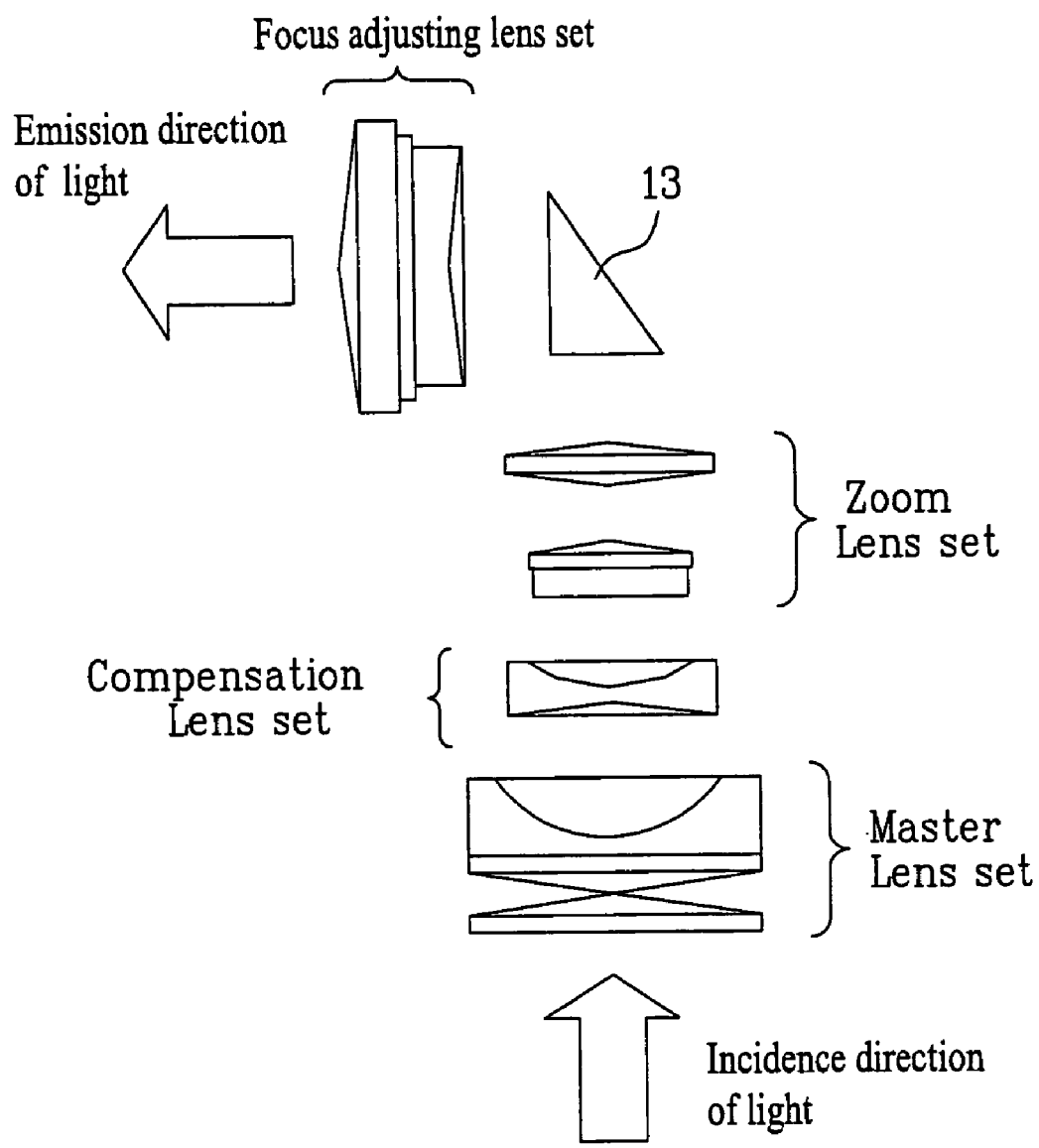
FIGS. 13A to 13D are views illustrating various embodiments of the projection lens unit included in the thin projector according to the present invention, respectively.
Figure 13B:
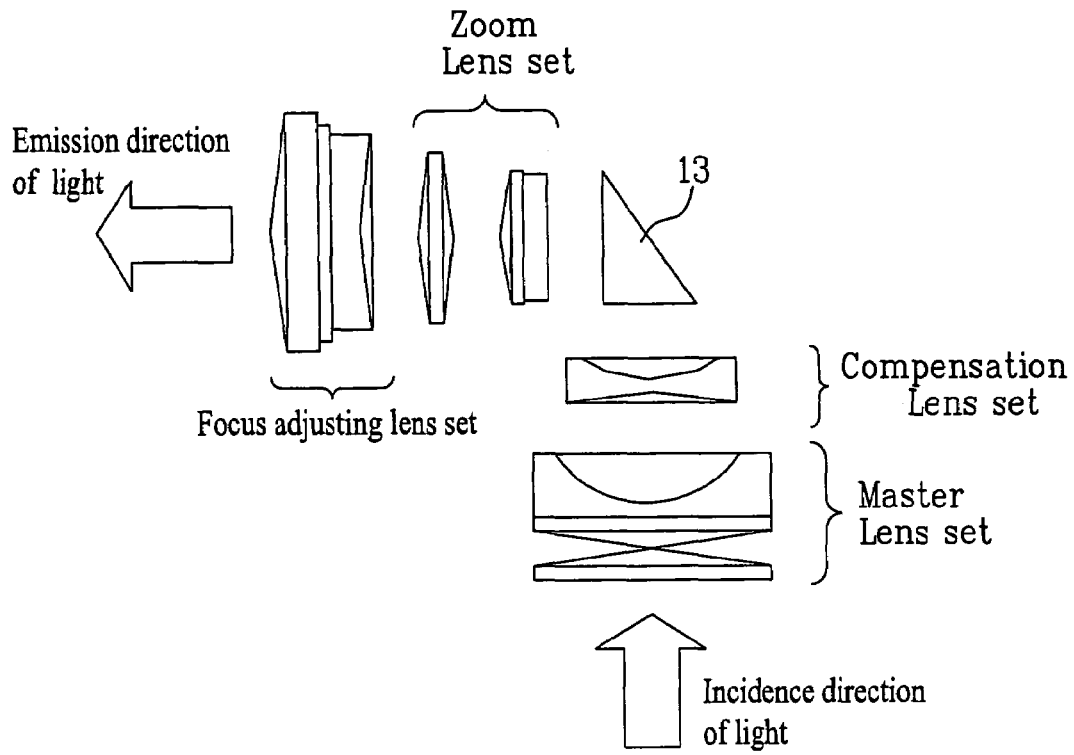
Figure 13C:
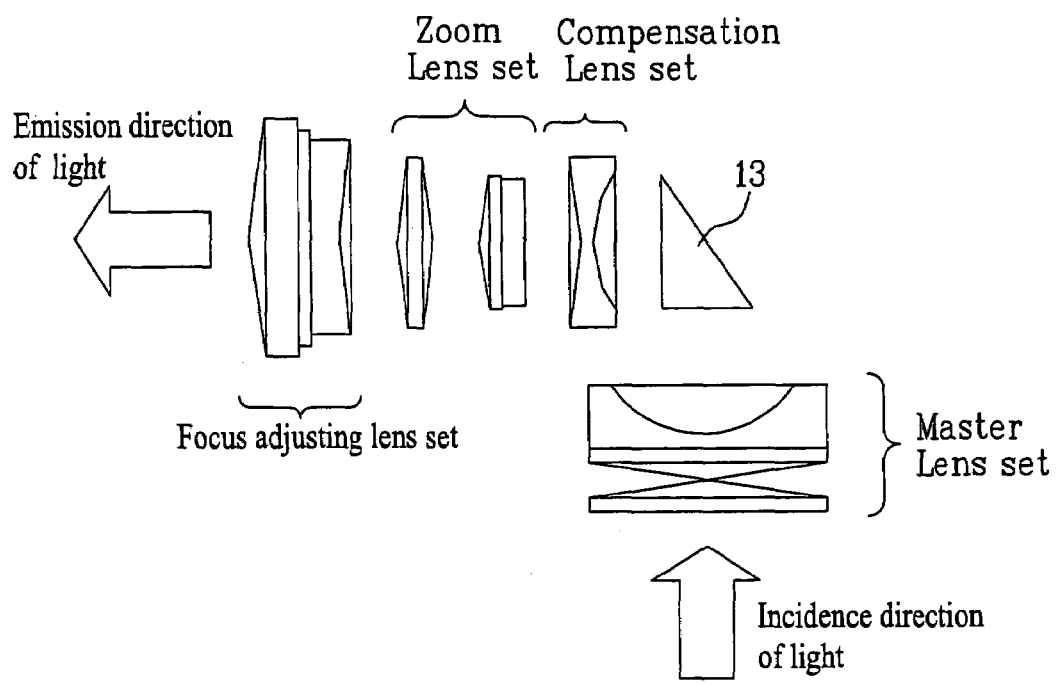
Figure 13D:
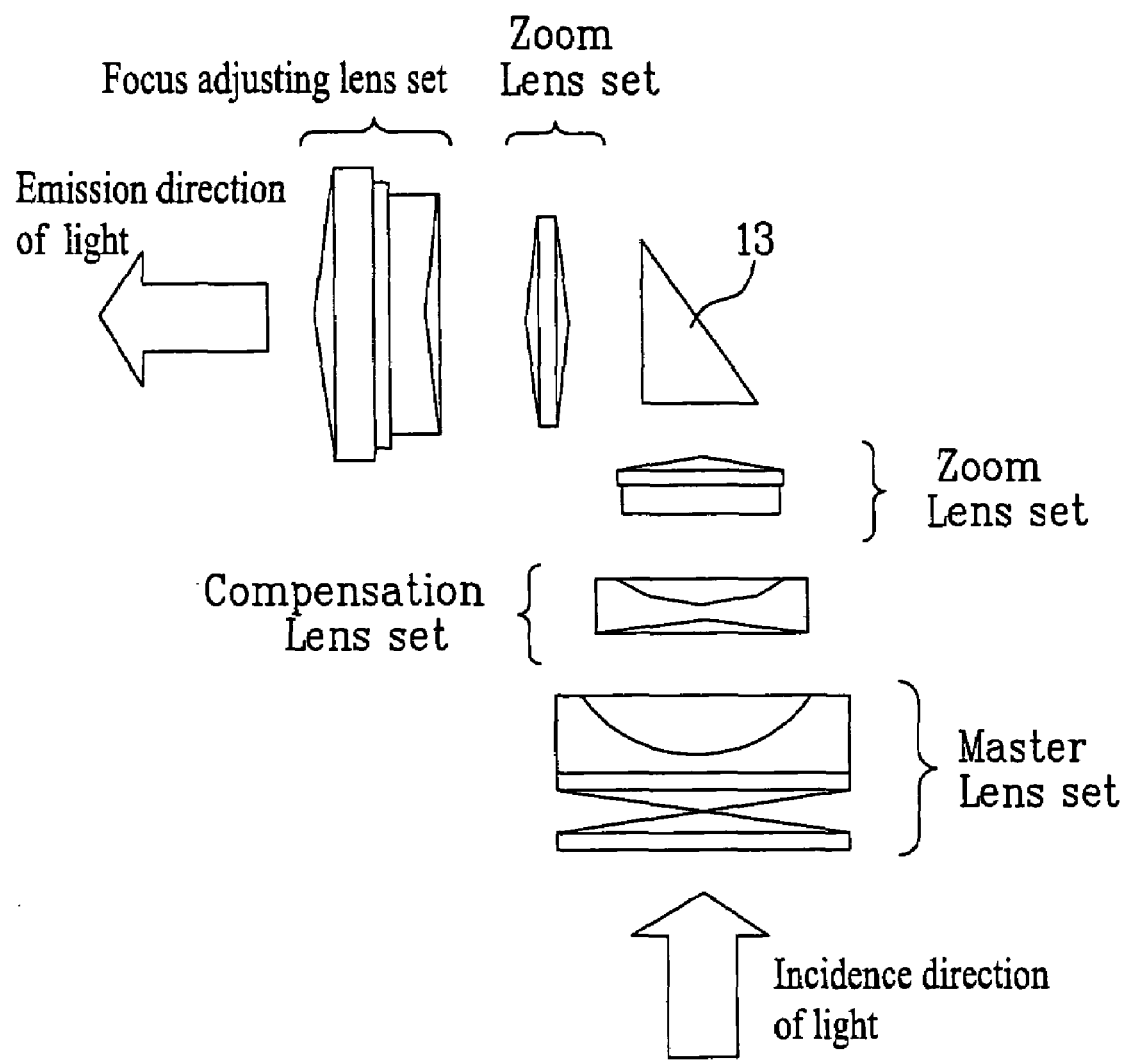

The reflector 13 may be arranged between the focus adjusting lens and the zoom lens, as shown in FIG. 13A, may be between the zoom lens and the compensation lens, as shown in FIG. 13B, may be arranged between the compensation lens and the master lens, as shown in FIG. 13C, or may be arranged between zoom lenses which are included in the second lens set, as shown in FIG. 13D.

In accordance with another embodiment of the present invention, the reflector may be arranged at an upstream end of the projection lens set.

Figure 14:
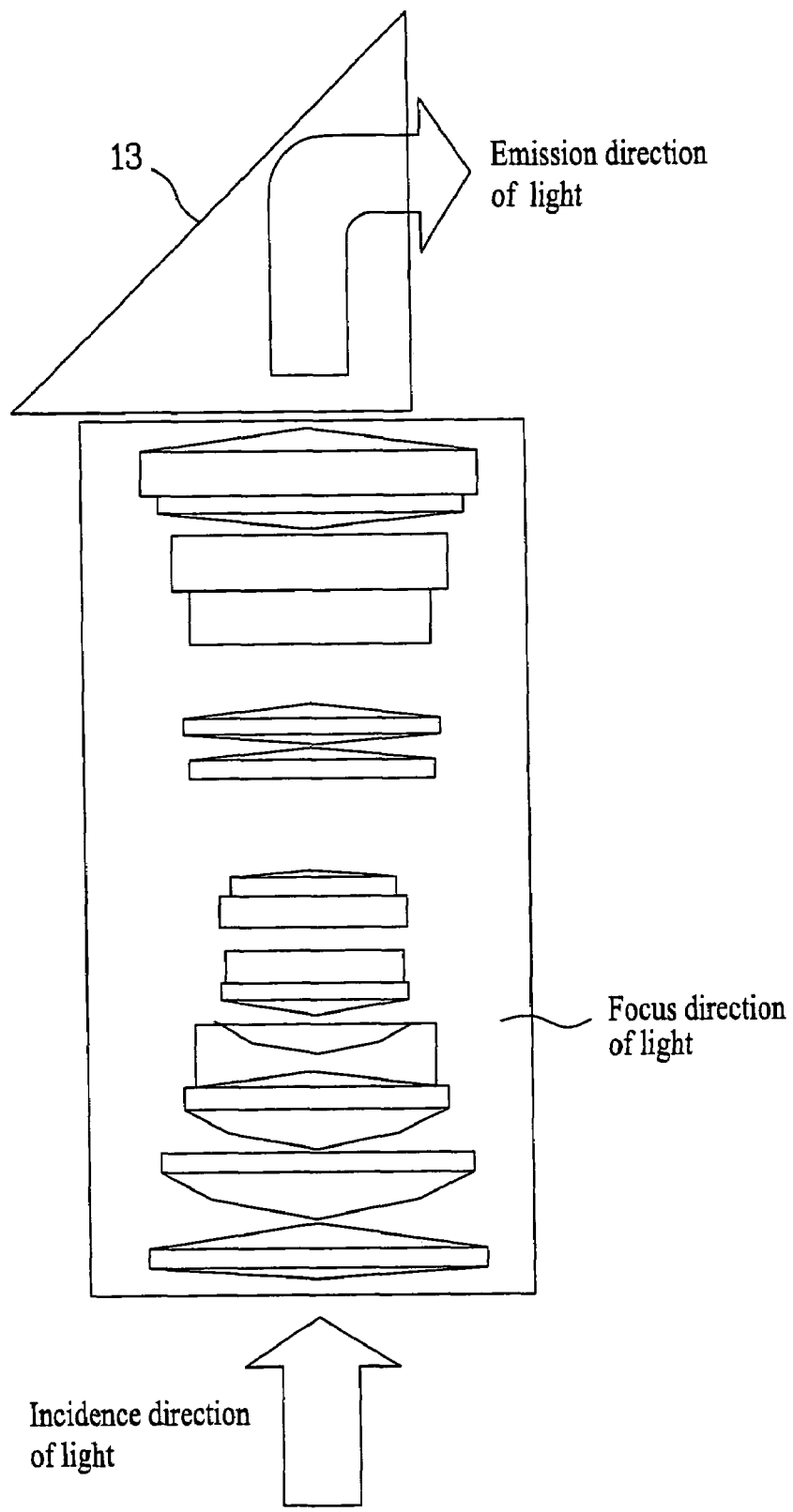
FIG. 14 is a view illustrating another embodiment of the projection lens unit included in the thin projector according to the present invention.

FIG. 14 illustrates another embodiment of the projection lens unit included in the thin projector according to the present invention.

As shown in FIG. 14, the reflector 13 is arranged at the upstream end of the projection lens set, to change the direction of the light emitted from the projection lens unit such that the light is externally emitted from the housing.

The present invention provides a thin projector which includes an optical system configured to reduce the thickness of the projector, so that the projector can be conveniently installed in a minimal installation space.

In accordance with the present invention, the thin projector includes a shiftable projection lens. Accordingly, it is possible to conveniently adjust the emission direction of light.

In accordance with the present invention, a sensor is used to prevent the projector from operating when the projector is incorrectly or unstably installed. Accordingly, it is possible to eliminate a danger such as fire.

Since thinness of a projector can be achieved in accordance with the present invention, it is possible to conveniently install the projector in diverse places.

It will be apparent to those skilled in the art that various modifications and variations can be made in the present invention without departing from the spirit or scope of the inventions. Thus, it is intended that the present invention covers the modifications, and variations of this invention provided they come within the scope of the appended claims and their equivalents.

What is claimed is:

1. A projector comprising:
    a housing having a front side, a rear side, and lateral sides, wherein each of the front side and the rear side has an area larger than an area of each of the lateral sides;
    an illumination unit arranged in an interior of the housing, the illumination unit generating light and emitting the generated light;
    a micro device arranged in the interior of the housing, the micro device receiving the light from the illumination unit and producing an image using the received light;
    a projection lens unit to project the image on a screen, the projection lens unit reflecting and emitting the image through the front side having an area larger than the area of each of the lateral sides; and
    a fixing member adapted to fix the housing in an upright state in which the front side is vertically oriented, wherein the projection lens unit projects the image along an optical axis that is at least substantially perpendicular to the front side and wherein a top or bottom side of the housing has an area smaller than an area of the front or rear side of the housing.

2. The projector according to claim 1, wherein the projection lens unit is configured to reflect the light out of a plane which carries light emitted from the illumination unit and the image produced from the micro device within the interior of the housing, wherein said plane is parallel to the front side of the housing.

3. The projector according to claim 1, wherein the front side of the housing has horizontal and vertical lengths which are equal to or different from each other.

4. The projector according to claim 1, wherein the projection lens unit comprises:
    a first lens set adapted to emit light carrying the image produced from the micro device;
    a second lens set arranged perpendicularly to a central axis of the light emitted from the first lens set, and adapted to project the light emitted from the first lens set onto the screen; and
    a reflector arranged between the first lens set and the second lens set, and adapted to change the light emitted from the first lens set such that the light emitted from the first lens set is incident on the second lens set.

5. The projector according to claim 4, wherein the first lens set comprises at least one focusing lens which is shiftable perpendicularly to a central axis of light emitted from the second lens set, to adjust a focus of the image.

6. The projector according to claim 4, wherein the second lens set comprises at least one zoom lens which is shiftable perpendicularly to the central axis of the light emitted from the first lens set, to adjust a focus of the image.

7. The projector according to claim 4, wherein the reflector comprises a fully-reflective mirror or a prism.

8. The projector according to claim 4, wherein the central axis of the light emitted from the first lens set is perpendicular to a central axis of light emitted from the second lens set.

9. The projector according to claim 4, wherein the first and second lens sets are arranged perpendicularly to an image display face of the micro device.

10. The thin projector according to claim 1, wherein the projection lens unit is shiftable in a vertical direction of the front side of the housing, to adjust a position of the image projected onto the screen.

11. The projector according to claim 1, wherein the micro device is a liquid crystal display (LCD) panel, a liquid crystal on silicon (LCOS) panel, or a digital micromirror device (DMD) panel.

12. The projector according to claim 1, wherein the projection lens unit comprises a first lens set, a second lens set, a third lens set, a fourth lens set, and a reflector arranged between adjacent ones of the first, second, third, and fourth lens sets, to change a direction of light incident on the projection lens unit.

13. The projector according to claim 12, wherein the first lens set comprises at least one focus adjusting lens, the second lens set comprises at least one zoom lens, the third lens unit comprises at least one compensation lens, and the fourth lens set comprises at least one master lens.

14. The projector according to claim 1, further comprising:
    a reflector arranged at an upstream end of the projection lens unit, and adapted to change a direction of light emitted from the projection lens unit such that the hght emitted from the projection lens unit is externally emitted from the housing.

15. The projector according to claim 1, wherein the illumination unit comprises:
    a light source adapted to generate light;
    a first illumination lens set adapted to provide a uniform brightness of the light generated from the light source;
    a second illumination lens set adapted to converge light emitted from the first illumination lens set; and
    a prism adapted to cause light emitted from the second illumination lens set to be incident on the micro device, and to cause light emitted from the micro device to be incident on the projection lens unit.

16. The projector according to claim 15, wherein the illumination unit further comprises:
    a color wheel arranged between the light source and the first illumination lens set, and adapted to separate the light generated from the light source into color light components; and
    a mirror or prism arranged between the first illumination lens set and the second illumination lens set, and adapted to reflect light emitted from the first illumination lens set to the second illumination lens set.

17. The projector according to claim 15, wherein the light source and the first illumination lens set are arranged on the same optical axis, and the first illumination lens set and the second illumination lens set are arranged on different optical axes, respectively.

18. The projector according to claim 15, wherein the second illumination lens set and the prism are arranged on the same optical axis.

19. The projector according to claim 15, wherein the prism is a total internal reflection (TIR) prism, and is arranged over an image display face of the micro device.

20. The projector according to claim 15, wherein the first illumination lens set comprises a light tunnel adapted to provide a uniform brightness of light, and at least one condensing lens, and the second illumination lens set comprises at least one condensing lens adapted to converge light.

21. The projector according to claim 1, wherein the projection lens unit is arranged at one lateral side of the housing, the illumination unit is arranged at the top side of the housing, and a circuit for driving the projection lens unit, the illumination unit, and the micro device is arranged at the bottom side of the housing.

22. The projector according to claim 21, further comprising:
  air inlets formed at the lateral side of the housing where the projection lens unit is arranged and at the bottom side of the housing where the circuit is arranged; and
  an air outlet formed at the top side of the housing where the illumination unit is arranged.

23. A projector comprising:
  a housing having a front side, a rear side, and lateral sides, wherein each of the front side and the rear side has an area larger than an area of each of the lateral sides;
  an illumination unit arranged in an interior of the housing, the illumination unit generating light and emitting the generated light;
  a micro device arranged in the interior of the housing, the micro device receiving the light from the illumination unit and producing an image using the received light;
  a projection lens unit to project the image on a screen, the projection lens unit reflecting and emitting the image through the front side having an area larger than the area of each of the lateral sides; and
  a fixing member adapted to fix the housing in an upright state in which the front side is vertically oriented, wherein the projection lens unit projects the image along an optical axis that is at least substantially perpendicular to the front side and wherein areas of the front side and the rear side are larger than areas of all other sides of the housing.

24. The projector according to claim 1, wherein the housing has substantially an oval shape.

25. The projector according to claim 1, wherein the housing has substantially a triangular shape.

26. The projector according to claim 1, wherein the housing has substantially a circular shape.

27. The projector according to claim 1, wherein the housing has substantially an polygonal shape.

\* \* \* \* \*